United States Patent [19]
Kuwabara et al.

[11] Patent Number: 5,160,244
[45] Date of Patent: Nov. 3, 1992

[54] PUMP SYSTEM OPERABLE BY VARIABLE-SPEED CONTROL

[75] Inventors: Takao Kuwabara, Hitachi; Eizo Kita, Kyoto, both of Japan

[73] Assignees: Hitachi, Ltd., Tokyo; Kansai Electric Power Co., Ltd., Osaka, both of Japan

[21] Appl. No.: 564,138

[22] Filed: Aug. 8, 1990

[30] Foreign Application Priority Data

Aug. 8, 1989 [JP] Japan ................................ 1-205205

[51] Int. Cl.$^5$ ............................................. F04D 15/00
[52] U.S. Cl. .......................................... 417/36; 417/22; 417/27; 417/28; 417/40; 417/45; 290/52
[58] Field of Search .................. 417/22, 26, 27, 28, 417/36, 40, 45; 290/52

[56] References Cited

U.S. PATENT DOCUMENTS

| | | | |
|---|---|---|---|
| 4,287,429 | 9/1981 | Bashnin et al. | 290/52 |
| 4,708,594 | 11/1987 | Shinmei et al. | 417/45 |
| 4,816,696 | 3/1989 | Sakayori et al. | 290/52 |

FOREIGN PATENT DOCUMENTS 63-212774 9/1988 Japan .

*Primary Examiner*—Richard A. Bertsch
*Assistant Examiner*—David W. Scheuermann
*Attorney, Agent, or Firm*—Fay, Sharpe, Beall, Fagan, Minnich & McKee

[57] ABSTRACT

A variable-speed pump system comprising: a hydraulic machine having a flow adjusting means and including at least a pumping function; a rotary machine operatively connected to the hydraulic machine and including at least a motor function for rotating the hydraulic machine; a frequency converter for driving the rotary machine; and a control system for controlling variable-speed operation of the rotary machine according to a command signal from an external unit. The pump system also includes an electric power control system, a flow adjustment control system, and a rotational speed control system. The power control system has a negligibly small time constant, compared to the time constant of the rotational speed control system. The flow adjustment control system and/or the rotational speed control system has a means for setting a transmission function in such a manner that a mechanical load of the hydraulic machine is not reduced while the rotational speed thereof is increasing, and that the mechanical load is not increased while the rotational speed is lowering.

26 Claims, 18 Drawing Sheets

PUMP SYSTEM OPERABLE BY VARIABLE-SPEED CONTROL

BACKGROUND OF THE INVENTION

1. Field of the Invention

This invention relates generally to a pump system including a variable-speed drive unit composed of a frequency converter and an electric rotary machine, and a hydraulic machine (pump, pump turbine or the like) operated at a variable speed by the variable-speed drive unit and having at least a pump function. More particularly, the invention relates to a pump system which is operable, in quick response to external command signals, by a variable speed control suited for improving the demand-supply balance of electric power of an electric power system.

2. Description of the Related Art

In conventional pumped storage power plants, it has been a common practice to perform either a generating operation or pumping-up operation, with the rotational speed of a pump turbine being fixed at a common constant value and, during pumping-up operation, linearly adjusting an opening amount on guide vanes of the pump turbine according to a predetermined function of the head.

However, the above conventional plants bear only mere loads having no degree of freedom (unadjustable), from the view point of the electric power system, during pumping-up operation to that no adjustment is possible to improve the demand-supply balance of electric power of the electric power system.

To this end, variable-speed pump systems have recently been proposed in which the rotational speed of a pump turbine is variable so as to correspond with the electrical power system during the pumping-up operation.

For example, Japanese Patent Laid-Open Publication No. 203883/1984 discloses an operating method in which, if a request was issued to reduce the input to a pump from the system while the pump is operating, the rotational speed of the pump is lowered, without creating variation or noise. This is accomplished by controlling the amount of opening of guide vanes prior to the speed control of a speed control unit of an induction generator-motor only during reduction of input to the pump.

Further, Japanese Patent Laid-Open Publication No. 128886/1985 discloses another operating method in which, if a request was issued to increase the input to a pump from the system while the pump is operating, the rotational speed of a pump is increased, without creating vibration of noise, by controlling the speed change of an induction generator-motor prior to the control of opening of the guide vanes for adjusting the amount of water flow, only during increase of input to the pump.

However, these two prior operating methods aim primarily at the stability of operation of a pump and vary the rotational speed of the pump within the range, in which the pump is stably operated, in an attempt to meet the request from the electric power system. Since this elongates the total response time of the system more than necessary, it is impossible to quickly respond to rapid fluctuations of the electric power system.

To cope with this prior problem, a solution was proposed by Japanese Patent Laid-Open Publication No. 212774/1988 disclosing a technical concept of controlling a variable-speed pumping-up generator to respond quickly to the fluctuation of the electric power system.

The variable-speed pump system of the Japanese Publication No. 212774/1988, as shown in FIG. 17 of the accompanying drawings, comprises a variable-speed drive unit composed of a frequency converter 3 and an electric motor 2, a pump 4 for being operated at a variable speed by the variable-sped drive unit, and a control system for controlling the variables-speed drive unit and the pump 4.

The control system of this prior pump system is equipped with a rotational speed control circuit, an electric power control circuit, and a guide vanes control circuit.

The rotational speed control circuit includes an optimum rotational speed function generator 12 for inputting an electric power command signal $P_O$ from outside and a static head HST (representing a water level difference of upper and lower reservoirs of the pump) at that time and then calculating an optimum rotational speed $N_{OPT}$ at that time from these inputs. The rotational speed control circuit further includes adder 18 which compares an output signal $N_{OPT}$ from the function generator 12 with a real rotational speed N and constitutes a negative feedback circuit, and an electric power control correction signal generator 16 equipped with at least an integrating element for nullifying the difference between the output signal $N_{OPT}$ and the real rotational speed N. Accordingly the rotational speed control circuit outputs a correction signal $\epsilon$.

The electric power control circuit includes an adder 19 for summing an electric power command signal $P_O$ and its correction signal $\epsilon$ to obtain a composite signal $P_O+\epsilon$, and an adder 20 which compares this composite signal with a real input PM and constitutes a negative feedback circuit, and an electric power controller 7 equipped with at least an integrating element for nullifying the difference between the composite signal and the real input $P_M$. Accordingly the input $P_M$ of the electric motor 2 is controlled by the frequency converter 3, which is for alternating excitation, so as to be a composite signal $P_O+\epsilon$.

The guide vanes control circuit includes an optimum amount-of-opening-of-guide-vanes signal generator 13 for inputting a load command signal $P_O$ from outside and a static head HST and then calculating an optimum amount of opening of the guide vanes $Y_{OPT}$ at that time from these inputs, an adder 21 which compares an output signal $Y_{OPT}$ of the signal generator 13 with a real amount of opening of the guide vanes Y and constitutes a negative feedback circuit, and guide vanes controller 9 for nullifying the difference between the output signal $Y_{OPT}$ and the real amount of opening of the guide vanes by an integral element built in the controller 9.

With this prior control system, it is possible to take in equilibrium state $N=N_{OPT}$ by the rotational speed control circuit, normally $P_M=P_O+\epsilon$ by the electric power control circuit, and $Y=Y_{OPT}$ by the guide vanes control circuit. Since the difference between an input $P_p$ requested by the pump and a real input $P_M$ to the electric motor is absorbed to zero by the integrating action of a moment of inertia $GD^2$, which is normally regarded as a sort of integrating element and is possessed by the electric motor 2 and the pump 4, $P_M=P_p$. Further, if errors of the function generators 12, 13 are neglected, substantially $Y_{OPT}=Y$ corresponding to $P_O$ and $N_{OPT}=N$ corresponding to $P_O$. Therefore the relation $P_O=P_p=P_M=P_O=\epsilon$ is established so that the correction signal $\epsilon$ for electric power control will be zero.

According to this prior technology, therefore, it is possible to control the real input $P_M$ in accordance with the electrical power command signal $P_O$ from outside. This prior technology is adapted to variable-speed pumps of the type in which the input of the electric motor responds slowly to the fluctuation of the electric power system, and particularly in such a manner that the rotational speed and the amount of opening of the guide vanes can virtually follow. However, this prior technology cannot be adapted to variable-speed pumps of the type in which the input of the electric motor is controlled quickly to respond to the fluctuation of electric power of the electric power system, and particularly with a negligibly small time constant, compared to the time constant of the rotation system dominated by a moment of inertia. This is because the difference between the quickly varying input of the electric motor and the rotational speed of the pump, as well as the varying speed of the amount of opening of the guide vanes, which follow that input, become too large in transient states so that dissociation would occur among the input of the electric motor, the rotational speed of the pump, and the amount of opening of the guide vanes.

Otherwise, assuming that the rotational speed of the pump and the response speed of the amount of opening of the guide vanes are increased in an attempt to avoid the dissociation, the balance between the rotational speed of the pump and the amount of opening of the guide vanes will be lost so that the pump would possibly fall into the partial reverse flow characteristic (hump characteristic) region.

Therefore, in the prior art, there is no disclosure or suggestion of the basic principles of the system in which the input of the electric motor is controlled with a negligibly small time constant, compared to the time constant of the rotation system, and the above described dissociation is reduced to a minimum, to avoid any partial reverse flow characteristic of the pump. In other words, there is no disclosure or suggestion of the basic principles of avoiding the reverse flow characteristics and reducing the control time constant of the motor input to a minimum.

SUMMARY OF THE INVENTION

It is therefore an object of this invention to provide a variable-speed pump system which responds to the electric power increase/decrease request of an electric power system quickly and reduces the above-described dissociation to prevent the operation of the pump from falling into the hump characteristic of a partial reverse flow region, thus guaranteeing stable operation.

According to a first aspect of the invention, there is provided a variable-speed pump system comprising: a hydraulic machine having a flow adjusting means and including at least a pumping function; a rotary machine operatively connected to the hydraulic machine and including at least a motor function for rotating the hydraulic machine; a frequency converter for driving the rotary machine; and a control system for controlling variable-speed operation of the rotary machine according to a command signal from outside. The control system includes 1) an electric power control system for controlling the output of the rotary machine commensurate with the command signal and a correction signal, 2) a rotational speed control system for outputting the correction signal to the electric power control system in such a manner that the hydraulic machine is rotated at a correct rotational speed with respect to the command signal, and 3) a flow adjustment control system for controlling the flow adjusting means of the hydraulic machine in such a manner that an amount of opening of the flow adjusting means is commensurate with the command signal. The electric power control system has a small time constant which is negligible as compared to the time constant of the rotational speed control system. The flow adjustment control system and/or the rotational speed control system has means for setting a transmission function in such a manner that a mechanical load of the hydraulic machine is smoothly increased so as not to allow an transient reduction while the rotational speed thereof is increasing, and that the mechanical load is smoothly decreased so as to not to allow any excessive transient reduction which would require a subsequent compensatory increase while the rotational speed is decreasing.

According to a second aspect of the invention, there is provided a variable-speed pump system comprising: a hydraulic machine having a flow adjusting means and including at least a pumping function; a rotary machine operatively connected to the hydraulic machine and including at least a motor function for rotating the hydraulic machine; a frequency convertor for driving the rotary machine; and a control system for controlling variable-speed operation of the rotary machine according to a command signal from outside or a signal corresponding to the command signal. The control system includes 1) an electric power control system for controlling the output of the rotary machine commensurate with the command signal and a correction signal, 2) a rotational speed control system for outputting the correction signal to the electric power control system in such a manner that the hydraulic machine is rotated at a correct rotational speed with respect to the command signal, and 3) a flow adjustment control system for controlling the flow adjusting means for the hydraulic machine in such a manner that an amount of opening of the flow adjusting means is commensurate with the command signal. The electric power control system has a small time constant which is negligible compared to the time constant of the rotational speed control system; a response $(\partial y/\partial t)$ of the flow adjustment control system and a response $(\partial n/\partial t)$ of the rotational speed control system being set in such a manner that at least one of the following inequalities is established:

$$\frac{\partial y}{\partial n} \cdot \frac{\partial p_p}{\partial y} + \frac{\partial p_p}{\partial n} > 0, \text{ and}$$

$$\frac{\partial y}{\partial n} \cdot \frac{\partial h}{\partial y} + \frac{\partial h}{\partial n} > 0$$

wherein y is a dimensionless amount of opening of the flow adjusting means, n is a dimensionless rotational speed of the hydraulic machine, $p_p$ is a dimensionless input of the hydraulic machine, and h is a dimensionless total dynamic head.

According to a third aspect of the invention, there is provided a variable-speed pump system in which a response $(\partial y/\partial t)$ of the flow adjustment control system and a response $(\partial n/\partial t)$ of the rotational speed control system being set in such a manner that the following inequality is established:

$$\left\{\frac{\partial p_p}{\partial n} + \frac{\partial y}{\partial n} \cdot \frac{\partial p_p}{\partial y}\right\} + \frac{\partial p_p}{\partial h}\left\{\frac{\partial y}{\partial n} \cdot \frac{\partial h}{\partial y} + \frac{\partial h}{\partial n}\right\} > 0$$

The rotational speed control system sets a correct rotational speed command signal with respect to a command signal from outside or a signal and corresponding to the command signal, then obtains a difference between the correct rotational speed command signal and a real rotational speed, and outputs a correction signal to nullify the difference.

For this purpose, the rotational speed control system preferably may include a function generating unit for outputting a target value of optimum rotational speed according to an electric power command signal and a static head, and a lag element for delaying the target value with a time constant corresponding to the state of operation and for outputting the delayed target value as a rotational speed command signal.

The lag element may have a change-over element for giving a large response speed when the rotational speed is to be increased and for giving a small response speed when the rotational speed is to be lowered.

The correction signal for correcting the rotational speed may be issued based on a difference between the rotational speed of the command outputted from the lag element and a real rotation speed.

Preferably, the flow adjusting means may be guide vanes.

The flow adjustment control system preferably may include: a function generating unit for outputting a target value of optimum amount-of-generating-of-guide-vanes command signal, as an external command signal, an electric power command signal and a static head; and a lag element for delaying the target value with a time constant corresponding to the state of operation and for outputting the delayed target value as an amount-of-opening-of-guide-vanes command signal.

The lag element may have a change-over element for giving a small response speed when the amount-of-opening-of-guide-vanes is to be increased and for giving a large response speed when the amount-of-opening-of-guide-vanes command signal is to be lowered.

The hydraulic machine may be a pump, a pump turbine or the like. And the rotary machine may be an electric motor, a generator-motor of the like.

In this invention, the amount of opening of the guide vanes in controlled based on a difference between the amount-of-opening-of-guide-vanes of the command and a real amount of opening of the guide vanes.

According to the electric power control system of this invention, the output of the electric motor can be quickly varied so as to follow the request of the electric power system. Meanwhile, by setting the individual responses of the rotational speed control system and the flow adjustment control system in accordance with the above-described conditions, the input of the electric motor can respond quickly.

In other words, the dissociation transitionally occurring among the input of the electric motor, the rotational speed of the pump and the amount of opening of the guide vanes is reduced to a minimum which may allow the partial reverse flow condition of the pump.

The above and other advantages, features and additional objects of this invention will be manifest to those versed in the art upon making reference to the following detailed description and the accompanying drawings in which some preferred embodiments incorporating the principles of this invention are shown by way of illustrative example.

BRIEF DESCRIPTION OF THE DRAWINGS

Like reference numerals designate similar parts or elements throughout several views, and basically any overlapping description is omitted for clarity.

DETAILED DESCRIPTION

Figure 1:
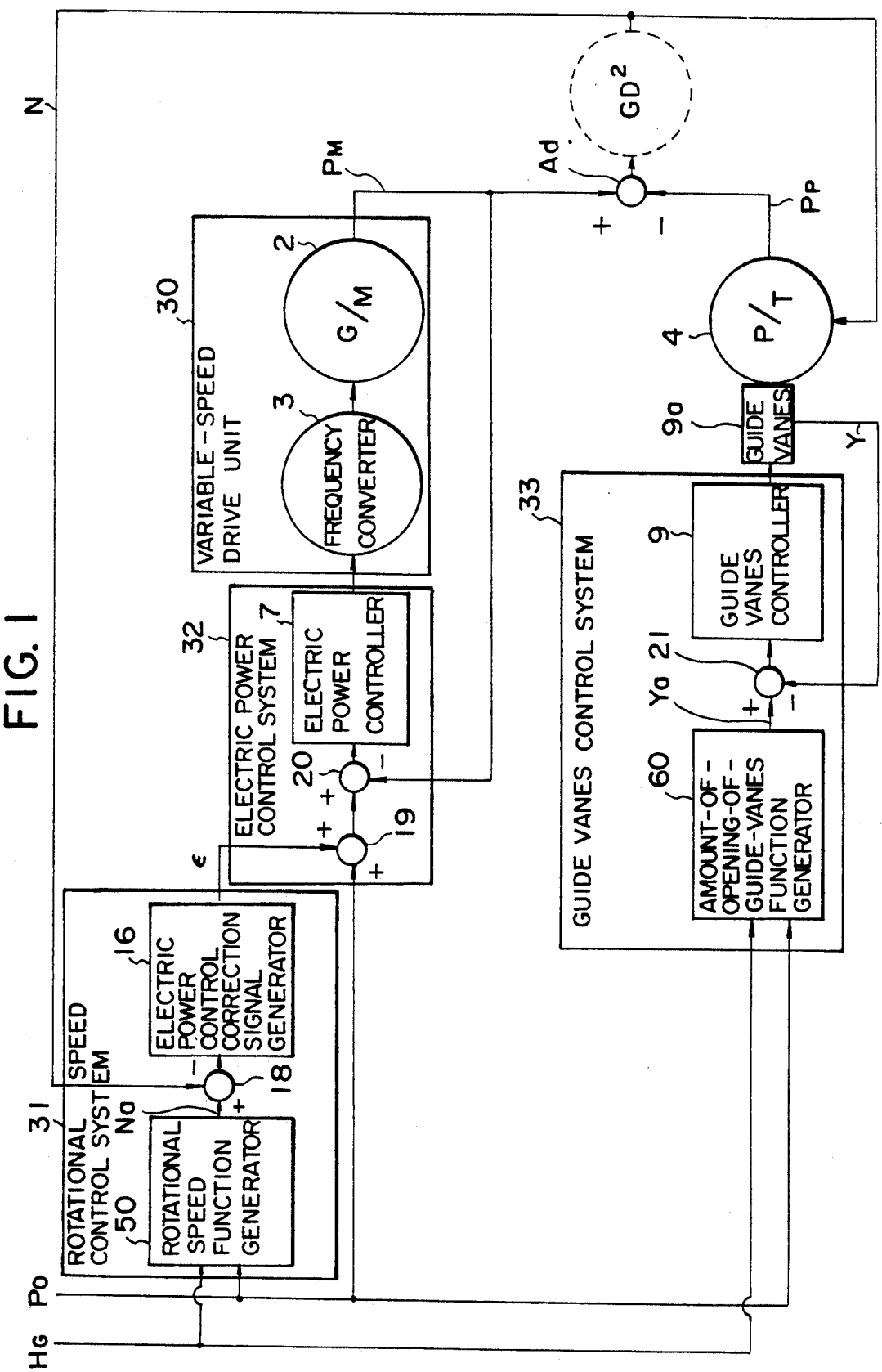
FIG. 1 is a block diagram of a variable-speed pump system according to one embodiment of this invention.

The principles of this invention are particularly useful when embodied in a variable-speed pump system whose functions are diagrammatically shown in FIG. 1.

The variable-speed pump system of FIG. 1 comprises a variable-speed drive unit 30 including a generator-motor 2 and a frequency converter 3, a pump turbine 4, and their control systems. The pump turbine 4 is, for example, a Francis type pump.

The frequency converter 3 includes, for example, a cyclo-converter and is connected between an electric power system (not shown in FIG. 1) and the generator-motor 2 and performs frequency conversion of electric power therebetween.

An a.c. exciter circuit for electric power control has no direct connection with this embodiment, and therefore, its detailed description is omitted here.

The control systems of the variable-speed pump system are an electric power control system 32 for controlling the driving of the generator-motor 2, a rotational speed control system 31 for controlling the rotational speed of the pump turbine and, as a control system for controlling a flow adjusting means which performs flow adjustment of the pump turbine, a guide vanes control system 33 for controlling the amount of opening of guide vanes 9a.

The rotational speed control system 31 is composed of a rotational speed function generator 50 for calculating an optimum rotational speed Na as a function of power command signal PO from outside and a meter head between upper and lower reservoirs of the pump turbine at that time, namely, a static head HG are inputted, an adder 18 for comparing real rotational speed N with an optimum rotational speed Na outputted from the function generator 50 to obtain a difference therebetween, and an electric power control correction signal generator 16 for generating a correction signal ε based on the result of summing of the adder 18.

The electric power control correction signal generator 16 includes an integrating element for nullifying the difference between the optimum rotational speed Na and the real rotational speed N.

A signal of the rotational speed N, which is outputted from a rotary system having a moment of inertia $GD^2$ is fedback for constituting a negative feedback control loop to the rotational speed control system. The rotational speed N is to be obtained as the real rotational speed of the rotation system, i.e., the generator-motor 2 and the pump turbine 4, is detected by a non-illustrated rotational speed sensor.

The moment of inertia $GD^2$ equivalently represents, as a function, the action of moment of inertia possessed by the rotary system, i.e., the generator-motor 2 and the pump turbine 4, and does not mean a real apparatus. The adder Ad for adding the output $P_M$ of the generator-motor 2 with the mechanical input $P_p$ of the pump turbine 4 equivalently represents that the difference therebetween is absorbed, as the change of energy, by the moment of inertia $GD^2$. And the adder Ad is not a real adder.

The electric power control system 32 includes an adder 19 for adding a power command signal $P_O$ from outside to a correction signal ε, and an adder 20 for adding to the output of the adder 19 a real output $P_M$ of the generator-motor 2 which output is detected by a nonillustrated sensor sensor. Electric power control system 32 further includes an electric power controller 7, and outputs an electric power control signal to the frequency converter 3. This electric power control system 32 adds a detection signal of the generator-motor output $P_M$, as a negative signal, to the adder 20, thus providing a negative feedback loop.

The electric power controller 7 includes an integrating element for normally nullifying the difference between the result of summing (P+ε) of the adder 19 and the actual generator-motor output PM.

The guide vanes control system 33 includes an amount-of-opening-of-guide-vanes function generator 60 for calculating an optimum amount of opening of the guide vanes 9a as the power command signal PO and the static head $H_G$ are inputted, an adder 21 for comparing an output signal Ya of the function generator 60 with the actual opening amount Y of the guide vanes 9a, which amount was detected by a non-illustrated sensor, to calculate a difference therebetween, and guide vanes controller 9 for controlling the guide vanes 9a of the pump turbine 4. This guide vanes control system 33 adds a detection signal of the real amount of opening Y of the guide vanes 9a, as a negative signal, to the adder 21, thus providing a negative feedback loop.

The guide vanes 9a are opened and closed by a nonillustrated servo motor and assume a suitable open posture according to the command signal. The guide vanes control system 33 also has a nonillustrated sensor for detecting this amount of opening of the guide vanes 9a.

The guide vanes controller 9 includes an integrating element for nullifying the difference between the output signal Ya from the function generator 60 and the real amount of opening Y of the guide vanes 9a. This guide vanes controller 9 also includes a portion for outputting a control signal, and a guide vanes servo motor for opening and closing the guide vanes 9a upon receipt of the control signal. In addition, a sensor for detecting the amount of opening of the guide vanes 9a may be included.

In the variable-speed pump system of this embodiment, under normal condition or in an equilibrium state, $N=Na$ and $P_M=(P_O+\epsilon)$ and $Y=Ya$ are determined by the rotational speed control system 31, the electric power control system 32 and the guide vanes control system 33, respectively.

The difference between the mechanical input $P_p$ to the pump turbine 4 and the real electric motor output $P_M$ of the generator-motor 2 is inputted to a combined moment of inertia $(GD^2)$ of the generator-motor 2 and the pump turbine 4. The moment of inertia may be regarded as a sort of integrating element. As discussed above, since the rotational speed control system 31 constitutes a negative feedback circuit, the control of the control system 31 is such that the difference between $P_M$ and $P_p$ will be zero. In other words, under normal condition, if $P_M=P_p$, or if the error of the function generator of the guide vanes opening 60 can be reduced to an extremely small value, substantially $Ya=Y$ corresponding to $P_O$, and $P_p$ will be controlled to initially substantially $P_O$, namely, $P_p=P_O$. Therefore, $$P_O = P_p = P_M = P_O + \epsilon$$

and, the electric power correction signal ε will finally be nullified.

With the foregoing arrangement of this embodiment, it is possible to control a real input $P_M$ according to a power command signal $P_O$ from outside.

Figure 9:
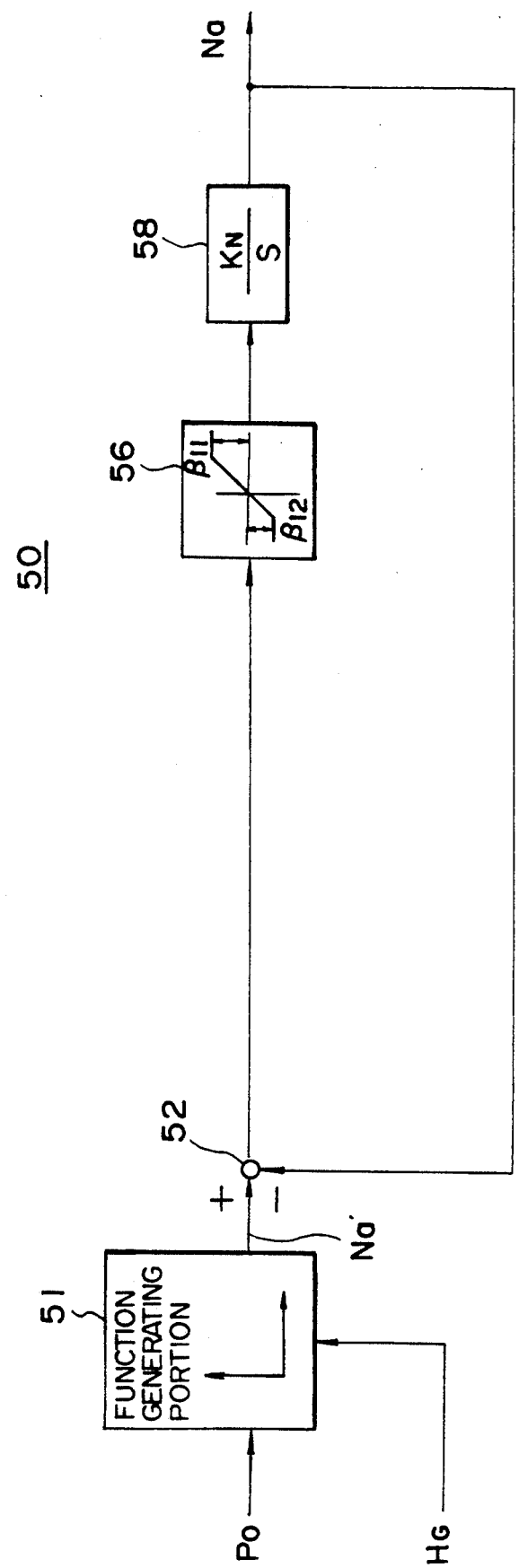
FIGS. 9, 10 and 11 are block diagrams respectively showing various examples of a rotational speed function generator.
Figure 10:
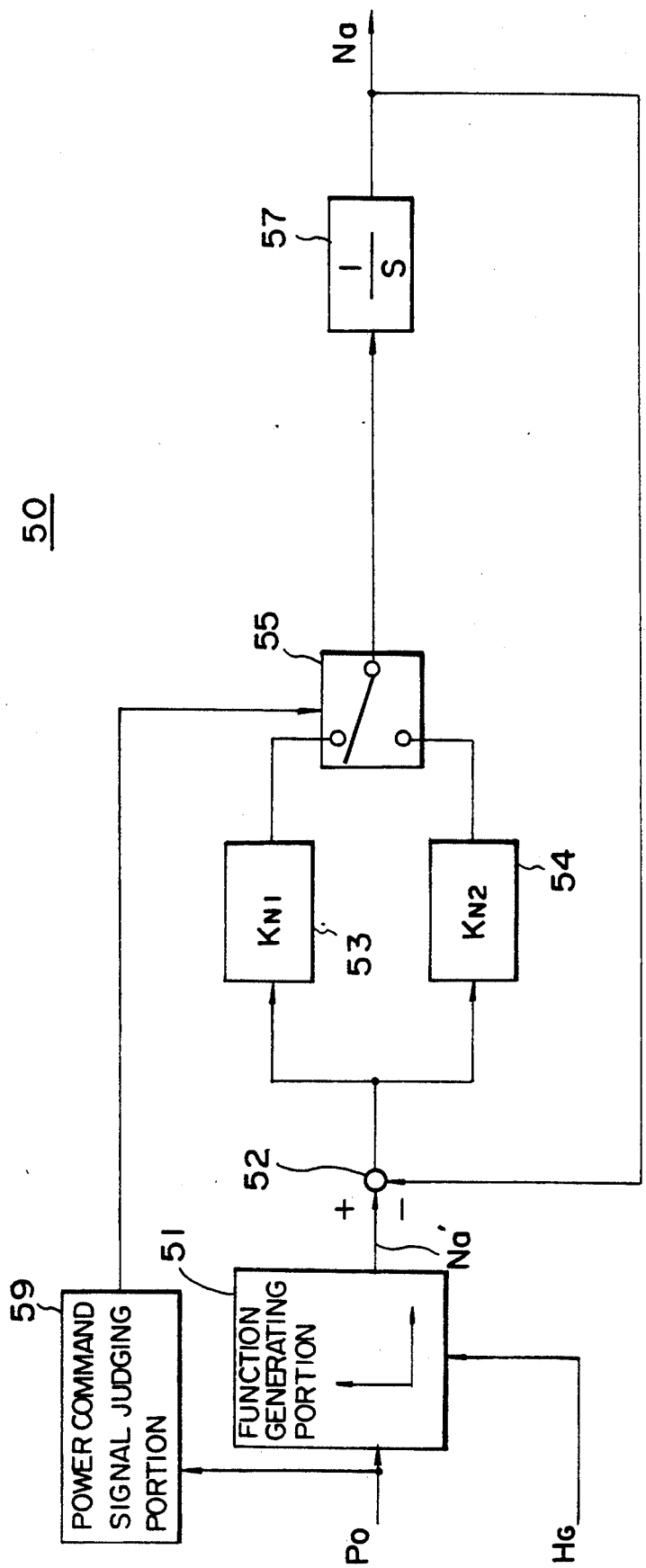
Figure 11:
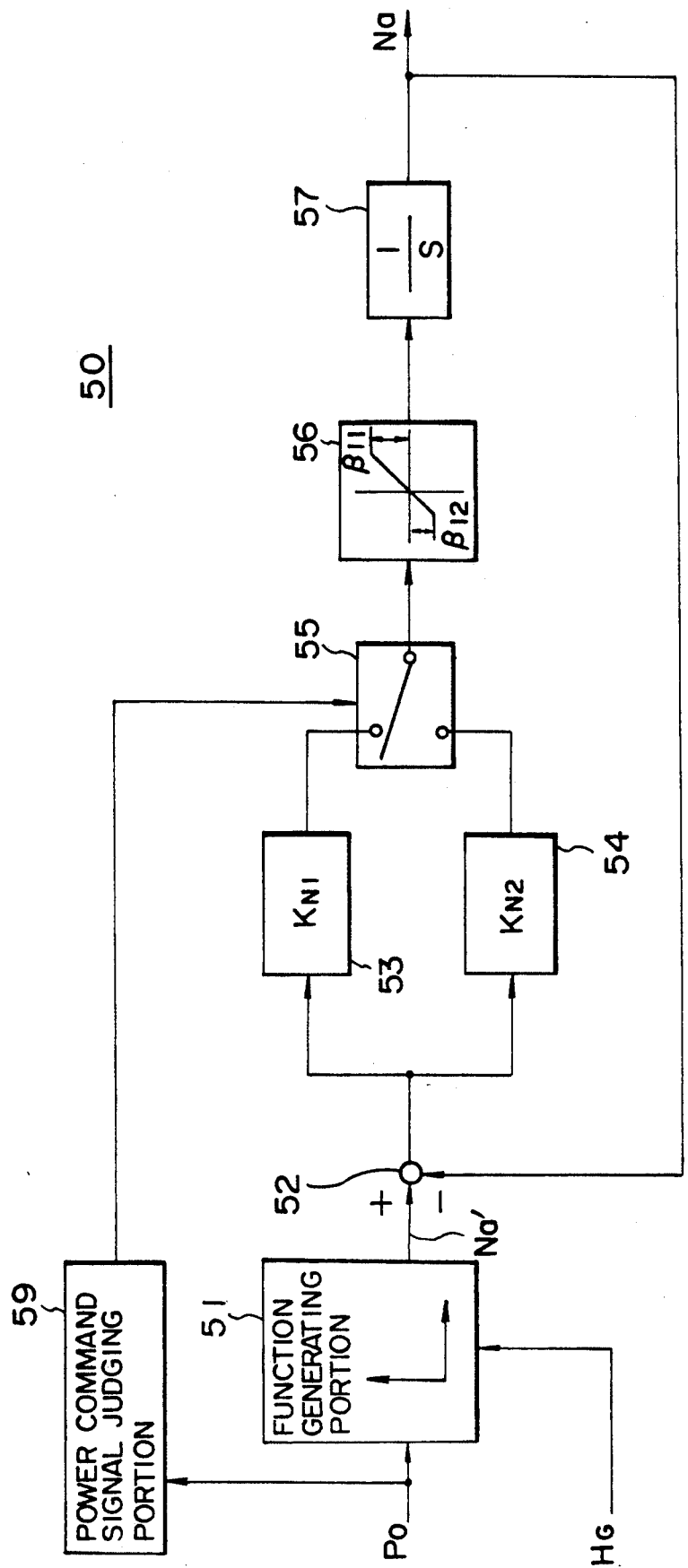

The rotational speed function generator 50 of FIG. 1, for example as shown in FIGS. 9, 10 and 11, may be equipped with a sort of lag element.

The arrangement of FIG. 9 includes a function generator 51 for producing and outputting a target value Na' of optimum rotational speed command signal according to the power command signal $P_O$ and the static head $H_G$, and a lag element circuit.

A first order lag element circuit may be used as the lag element circuit. The lag element circuit should by no means be limited to the first order lag element circuit, another delay circuit, for example a second order lag element circuit, may be used as the lag element circuit.

This lag element circuit includes a comparison portion 52 for comparing the target value Na' of the rotational speed command signal and the rotational speed command signal Na finally outputted, and for detecting the difference therebetween, a saturation element portion 56 for imparting saturation characteristics to the output signal of the comparison portion, and an integrating element portion 58 for integrating the output signal of the saturation element portion 56.

In the rotational speed function generator 50, the saturation element portion 56 has a saturation characteristic such that the increasing speed of the optimum rotational speed command signal Na is limited by a saturation value $\beta11$ while the lowering speed is limited by a remarkably small saturation value $\beta12$. Therefore the rotational speed command signal Na enables an increase of the increasing speed to an absolute value $|\beta_{11} \cdot KN|$ but enables a change of the lowering speed only to an absolute value $|\beta_{12} \cdot KN|$, so that the varying speed is controlled asymmetrically.

In order to avoid the above-mentioned dissociation, it should be preferable that $\beta11$ and $\beta12$ have their absolute values as large as possible and are not so spaced apart from each other.

Between the varying speed of the optimum rotational speed command signal Na and the varying speed of the optimum amount-of-opening-of-guide-vanes command signal Ya outputted from the function generator 60, the following relation is established:

When increasing the power command signal $P_O$, the increasing speed MAX of Na is larger than the increasing speed MAX of Ya.

When lowering the power command signal $P_O$, the lowering speed MAX of Na is smaller than the lowering speed MAX of Ya.

Owing to the above relationship, during a transitional time either when $P_O$ is increased or when $P_O$ is lowered, the rotational speed command signal Na is controlled to be higher than the on-cam value corresponding to the current value of Ya at any given moment, and is, finally, brought to a new on-cam value corresponding to the new $P_O$ or to the new Ya approaching from the higher side after a new equilibrium state is achieved after the change of $P_O$. Thus, the above relationship serves to prevent the pump from falling into hump characteristics with partial reverse flow.

In order to avoid the above-mentioned dissociation, it should be preferable that $K_{N1}$ and $K_{N2}$ have their absolute values as large as possible and are not so spaced apart from each other.

With this arrangement, the time constant of the lag element circuit, which includes the comparison portion 52, the gain element portions 53, 54, the switch portion 55, the integrating element portion 57, and the negative feedback path of the rotational speed command signal Na, will be $1/K_{N1}$ when increasing the power command signal $P_O$ and will be $1/K_{N2}$ when lowering the power command signal $P_O$. This is, the former will be small, while the latter will be large.

In the rotational speed function generator 50 of FIG. 10, owing to switching the time constant of one kind of the primary lag element disposed behind the function generator 51 for generating the target value Na' of the rotational speed command signal, the rotational speed command signal Na is controlled to be higher than the on-cam value corresponding to the current value of Ya at any given moment, and is, finally, brought to a new on-cam value corresponding to the new $P_O$ or to the new Ya approaching from the higher side after the new equilibrium state is achieved after the change of $P_O$. Thus, the above relationship serves to prevent the pump from falling into hump characteristics with partial reverse flow. This example, in which the time constant is switched, is different from the example of FIG. 9, in which the varying speed of the rotational speed command signal Na is limited.

The example of FIG. 11 is a combination of the examples of FIGS. 9 and 10; behind the function generator 51 for generating the target value Na' of the rotational speed command signal, a circuit as a sort of delay circuit is disposed for limiting the varying rate of the speed and switching the time constant concurrently.

Thus this rotational speed function generator 50 includes the function generator 51, the power command signal judging portion 59, and the lag element circuit.

The lag element circuit includes the comparison portion 52, the gain element portions 53, 54 connected parallel to each other, the switch portion 55, the saturation element portion 56, the integrating element portion 57, and the negative feedback path of the rotational speed command signal Na.

The action of this example will be performed by the combination of the lag element circuits of FIGS. 9 and 10.

In the examples of FIGS. 9, 10 and 11, a sort of lag element that enables automatic switching of the response speed is added to the rotational speed function generator 50, and likewise, a sort of delay circuit that enables automatic switching of the response speed can be added to the amount-of-opening-of-guide-vanes function generator 60. In sure a case, the rotational speed function generator 50 may have a peculiar leg element having no switching function. Of course, a delay circuit that enabled automatic switching of the response speed may be added to each of the rotational speed function generator 50 and the amount-of-opening-of-guide-vanes function generator 60.

Various examples of the amount-of-opening-of-guide-vanes function generator 60 will now be described with reference to FIGS. 12, 13 and 14.

Figure 12:
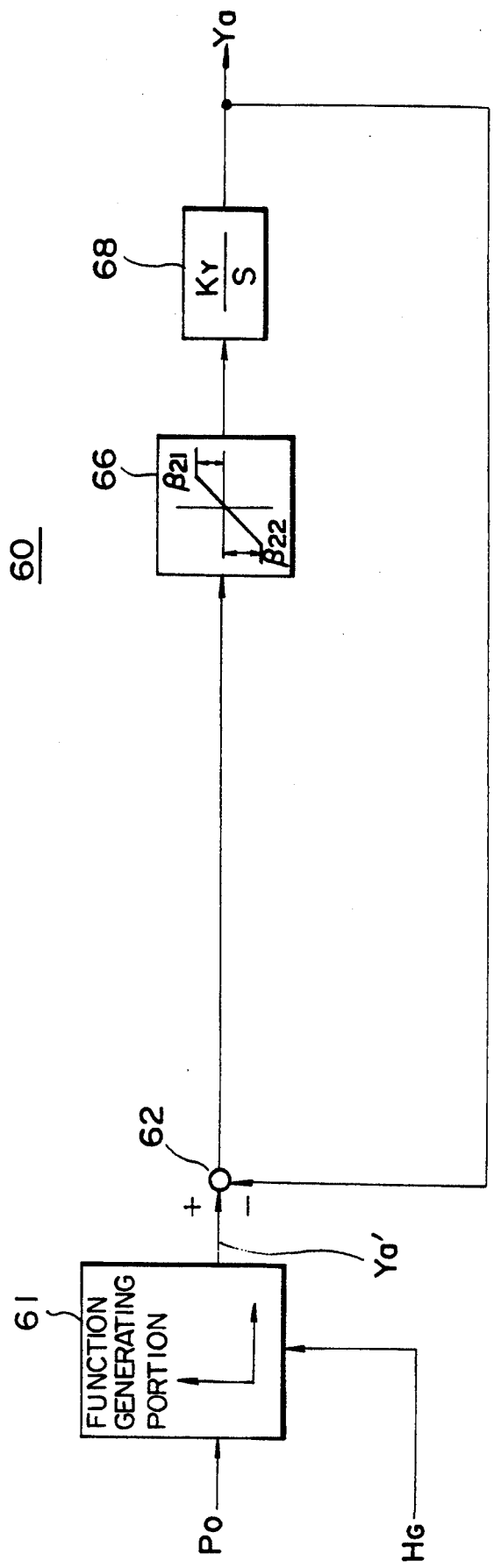
FIGS. 12, 13 and 14 are block diagrams respectively showing various examples of an amount-of-opening-of-guide vanes function generator.

The amount-of-opening-of-guide-vanes function generator 60 of FIG. 12 includes a function generator 61 and a primary delay circuit. The primary delay circuit includes a comparison portion 62, a saturation element portion 66, an integrating element 68, and the negative feedback path of the amount-of-opening-of-guide-vanes command signal Ya. The primary delay circuit is connected to the rear end of the function generation portion 61.

In this example, the target value Ya' of the optimum amount-of-opening-of-guide-vanes command signal is outputted from the function generator 61 according to the power command signal $P_O$ and the static head $H_G$ and is inputted to the above-mentioned lag element circuit. Further, the saturation element portion 66 is designed so as to regulate the increasing speed MAX and the lowering speed MAX of the amount-of-opening-of-guide-vanes command signal Ya to $|\beta_{231} \cdot K_Y|$ and $|\beta_{22} \cdot K_Y|$, respectively. The saturation value $\beta22$ is set so as to have an absolute value larger than the saturation value $\beta21$.

In order to avoid the above-mentioned dissociation, it should be preferable that $\beta21$ and $\beta22$ have their absolute values as large as possible and are not so spaced apart from each other. Thus the following relation is retained:

When increasing the power command signal $P_O$, the increasing speed MAX of Ya is smaller than the increasing speed MAX of Na.

When lowering the power command signal $P_O$, the lowering speed MAX of Ya is larger than the lowering speed MAX of Na.

Owing to the above relationship, during a transitional time either when $P_O$ is increased or when $P_O$ is lowered, the amount-of-opening-of-guide vane command signal Ya is controlled so as to be lower than the on-cam value corresponding to the current value of Na at any given moment, and is, finally, brought to a new on-cam value corresponding to the new $P_O$ or to the new Na approaching from the lower side after the new equilibrium state is achieved after the change of $P_O$. Thus, the above relationship serves to prevent the pump from falling into hump characteristics with partial reverse flow.

Figure 13:
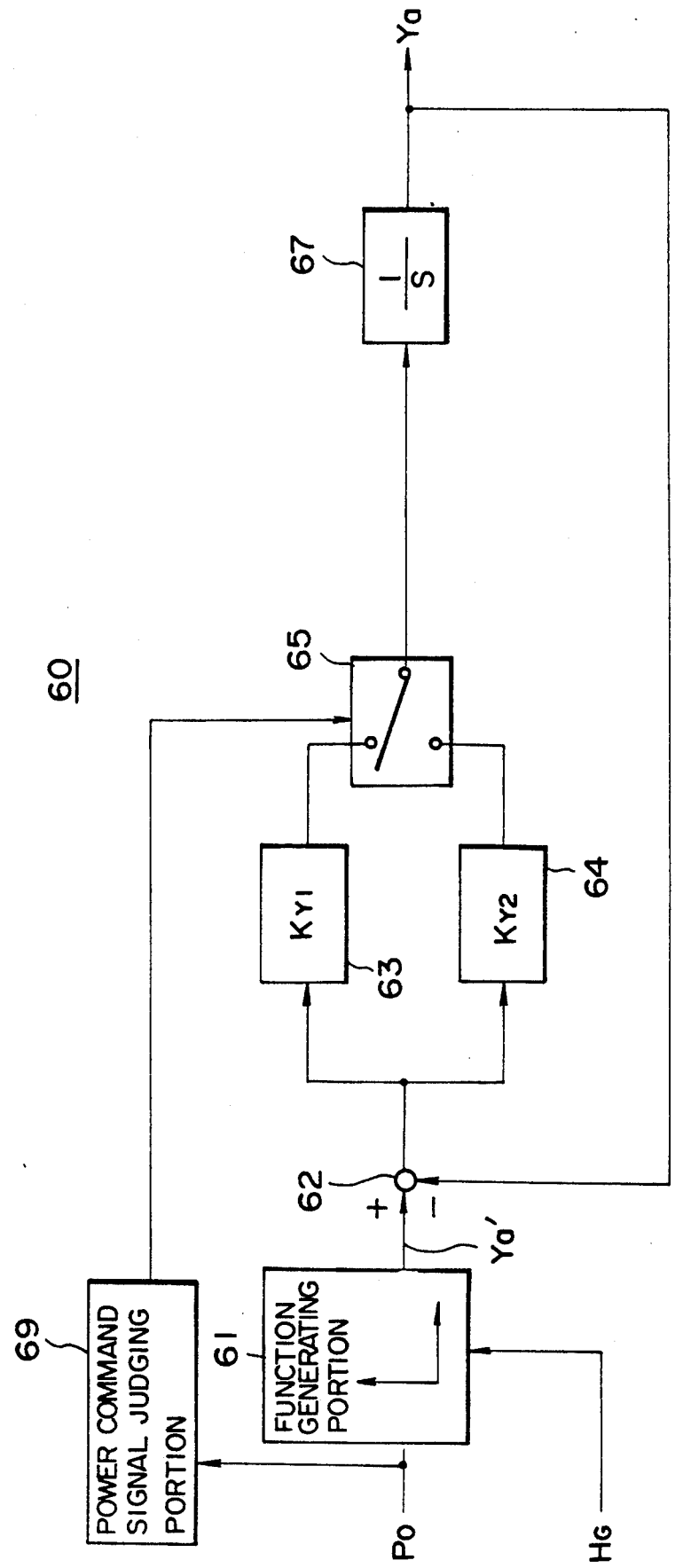

Unlike the example of FIG. 12 in which Ya approaches Ya' from its lower side by limiting the varying speed, the amount-of-opening-of-guide-vanes function generator 60 of FIG. 13 intends to perform the same result by switching the time constant of the lag element circuit behind Ya'.

The function generator 60 includes a function generating portion 61, a power command signal judging portion 69 for judging the increasing and lowering of the power command signal $P_O$ to control the switching action of the switch portion 65, and a first order lag circuit.

The lag element circuit includes a comparison portion 62, gain element portions 63, 64, a switch portion 65, an integrating element portion 67, and a negative feedback path of the amount-of-opening-of-guide-vanes command signal Ya.

The actions of individual portions of the function generator 60 are substantially the same as those of FIG. 10. The gain $K_{Y2}$ is set to be larger than $K_{Y1}$. When increasing the power command signal $P_O$, the gain $K_{Y1}$ is used, and when decreasing the power command signal $P_O$, the gain $K_{Y2}$ in used. In order to avoid the above-mentioned dissociation, it should be preferable that $K_{Y1}$ and $K_{Y2}$ have their absolute values as large as possible and are not so spaced apart from each other.

Figure 14:
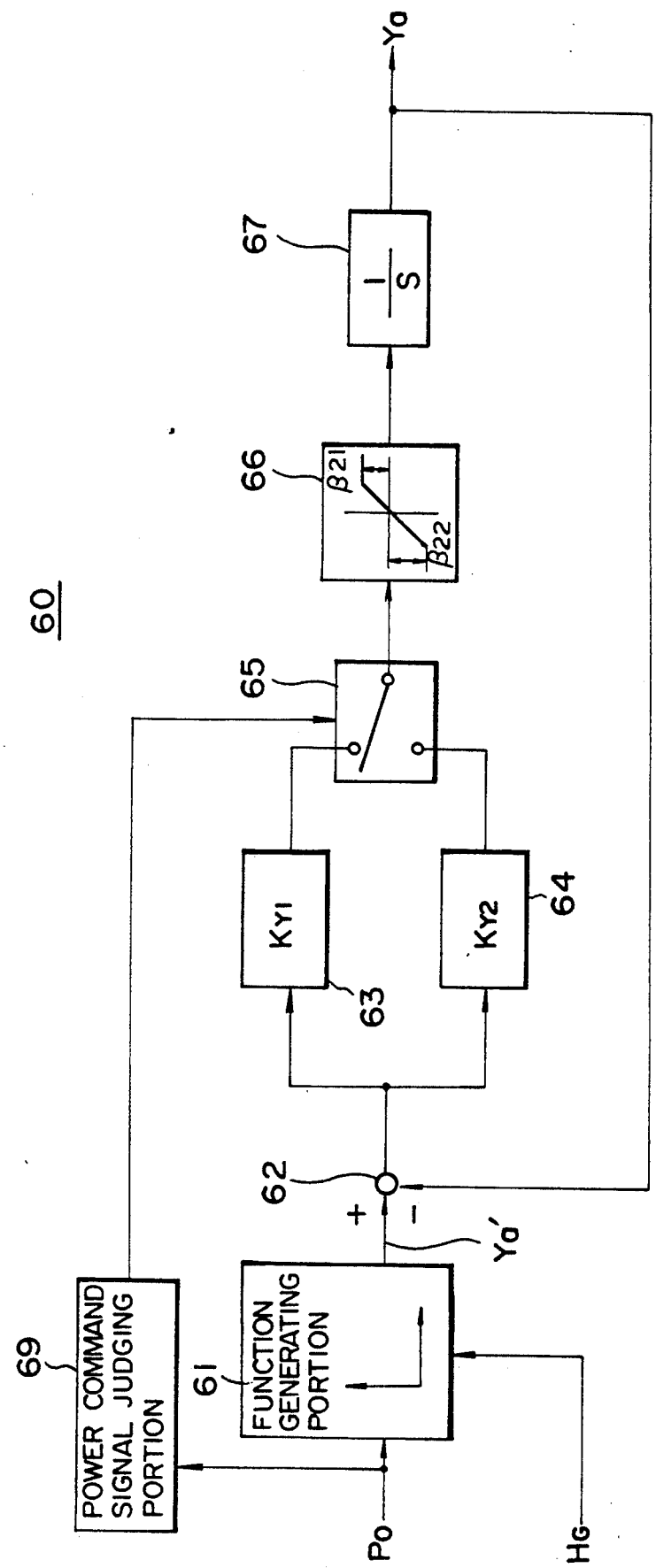

The example of FIG. 14 is a combination of the examples of FIGS. 12 and 13; behind the function generator 61 for generating the target value $Y_2'$ of the amount-of-opening-guide-vanes command signal, a circuit as a sort of delay circuit is disposed for limiting the varying rate of the speed and switching the time constant concurrently.

Thus this amount-of-opening-of-guide-vanes function generator 60 includes the function generator 61, the power command signal judging portion 69, and the lag element circuit.

The lag element circuit includes the comparison portion 62, the gain element portions 63, 64 connected parallel to each other, the switch portion 65, the saturation element portion 66, the integrating element portion 67, and the negative feedback path of the amount-of-opening-of-guide-vanes command signal Ya.

The action of this example will be performed by the combination of the lag element circuits of FIGS. 12 and 13.

In each of the examples of FIGS. 10, 11, 13 and 14, the switching of the gain element portions is performed prior to the integrating element. This is because the rotational speed command signal Na and the amount-of-opening-of-guide-vanes command signal Ya of the final output are prevented, by switching the gains, from jumping suddenly.

In the function generators 50, 60 of FIGS. 9 through 14, the setting of the time constant is such that the change, with time, of the rotational speed N, namely, dn/dt, and the change, with time, of the amount of opening of the guide vanes, namely dy/dt, satisfies discriminants (1) and (2) described below.

The function generators 50, 60 may be constituted by a computer, including at least other adders 18, 19, 20, 21 and the electric power control correction signal generator 16. Of course, only part of these elements or circuits may be computerized.

Figure 18:
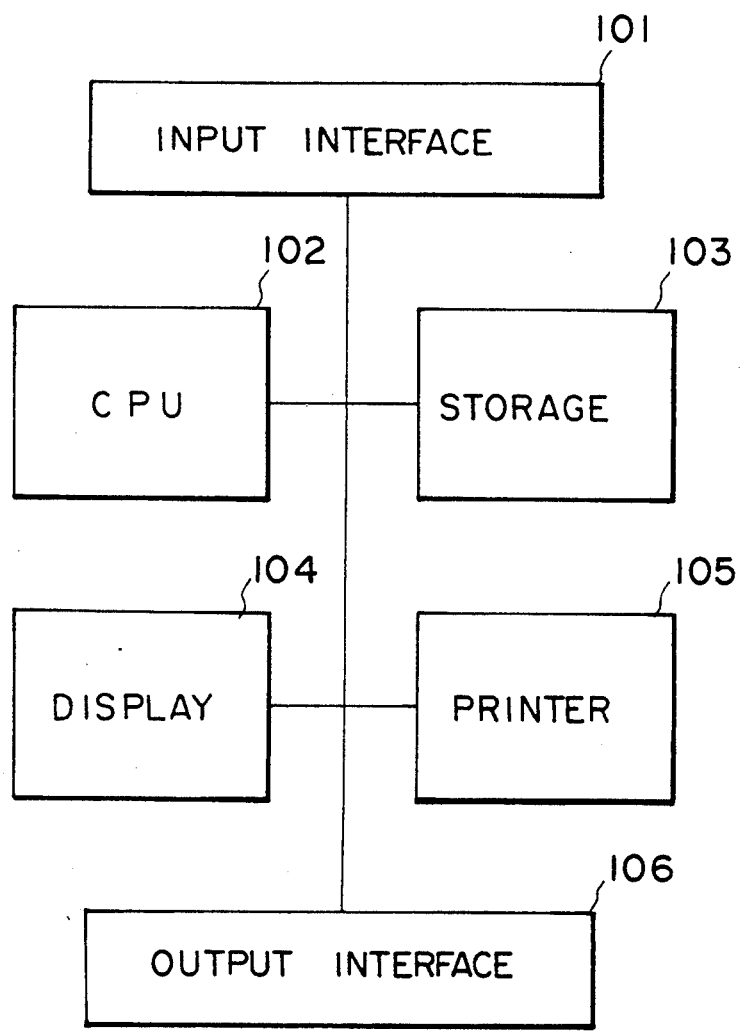
FIG. 18 is a block diagram showing an example of hardware of a computer system to be suitably used in a control system of the variable-speed pump system of this invention.

Specifically, as shown in FIG. 18, hardware of a computer system for control of the variable-speed pump system comprises, for example, an input interface 101 for inputting signals from the outside, an output interface 106 for outputting signals to the outside, a CPU (Central Processing Unit) 102 for executing data operations, a storage 103 for string a program and data including an operational algorithm to realize the functions of various portions of the CPU 102, a display 104 for displaying data, a printer 105, etc. In each of the function generators 50, 60, the lag element circuit is used as a means for setting a time constant. Of course, this invention should be no means be limited to this specific example.

In the foregoing embodiments, the function generating portion and the time constant setting portion are functionally separated. But these portions may be operated as a single function.

The above computerized arrangement may be adapted to other control systems such as a guide vanes control system, like the rotational speed control system. In that case, the hardware system can be commonly used.

The operation of the amount-of-opening-of-guide-vanes function generator 60 and of the function generating portion 61 in particular will now be described with reference to FIGS. 4 and 5.

Figure 4:
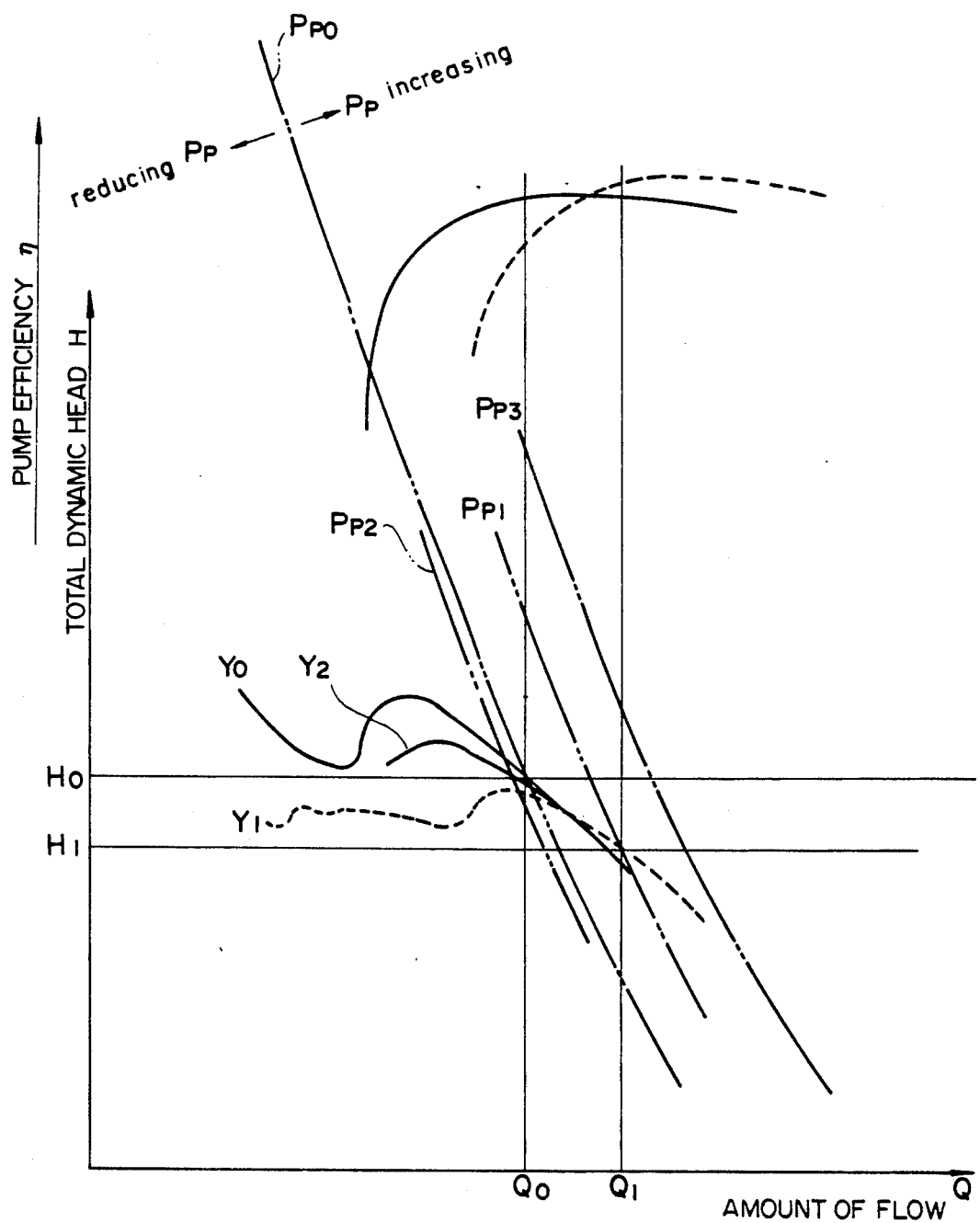
FIG. 4 is a characteristic graph showing the relation between the total dynamic head of a pump and the amount of flow of the pump.
Figure 5:
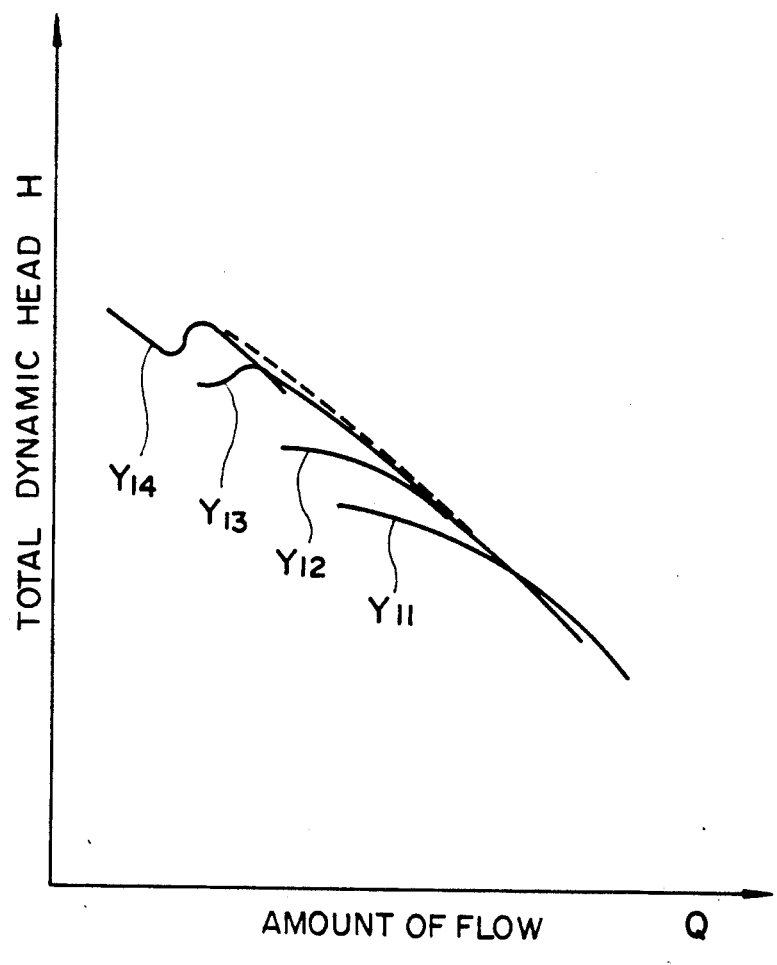
FIG. 5 is a characteristic graph showing the correcting and control of guide vanes while the rotation speed is constant.

The vertical coordinate H of FIG. 4 represents the total dynamic head (sum of a static head HG and a pipe-loss water head), while the horizontal coordinate represents the quantity of flow Q.

The amount of opening of the guide vanes is such that $YO < Y2 < Y1$, while the input of the pump is such that $Pp2 < Pp1 < Pp3$.

Assuming that H is increased from H1 to H0 while the rotational speed N is constant, the function generating portion 61 outputs a target value of the amount-of-opening-of-guide-vanes command signal in such a manner that the pump efficiency $\eta$ will be Maximal (or suitable) under H at that time and also that the amount of opening Y of the guide vanes is reduced from Y1 to Y0. Consequently the input of the pump will be lowered from Pp1 to Pp0; when H is varied in a wider range, the amount of opening of the guide vanes will be controlled along a dot-line envelope of FIG. 5.

In the above description, it was assumed that the rotational speed N is constant. Practically, as shown in FIG. 1, it is usual, in the case of variable speed pump system, that the rotational speed will be automatically set to a suitable rotational speed according to the static head H0.

The operation of this embodiment will now be described.

Figure 2:
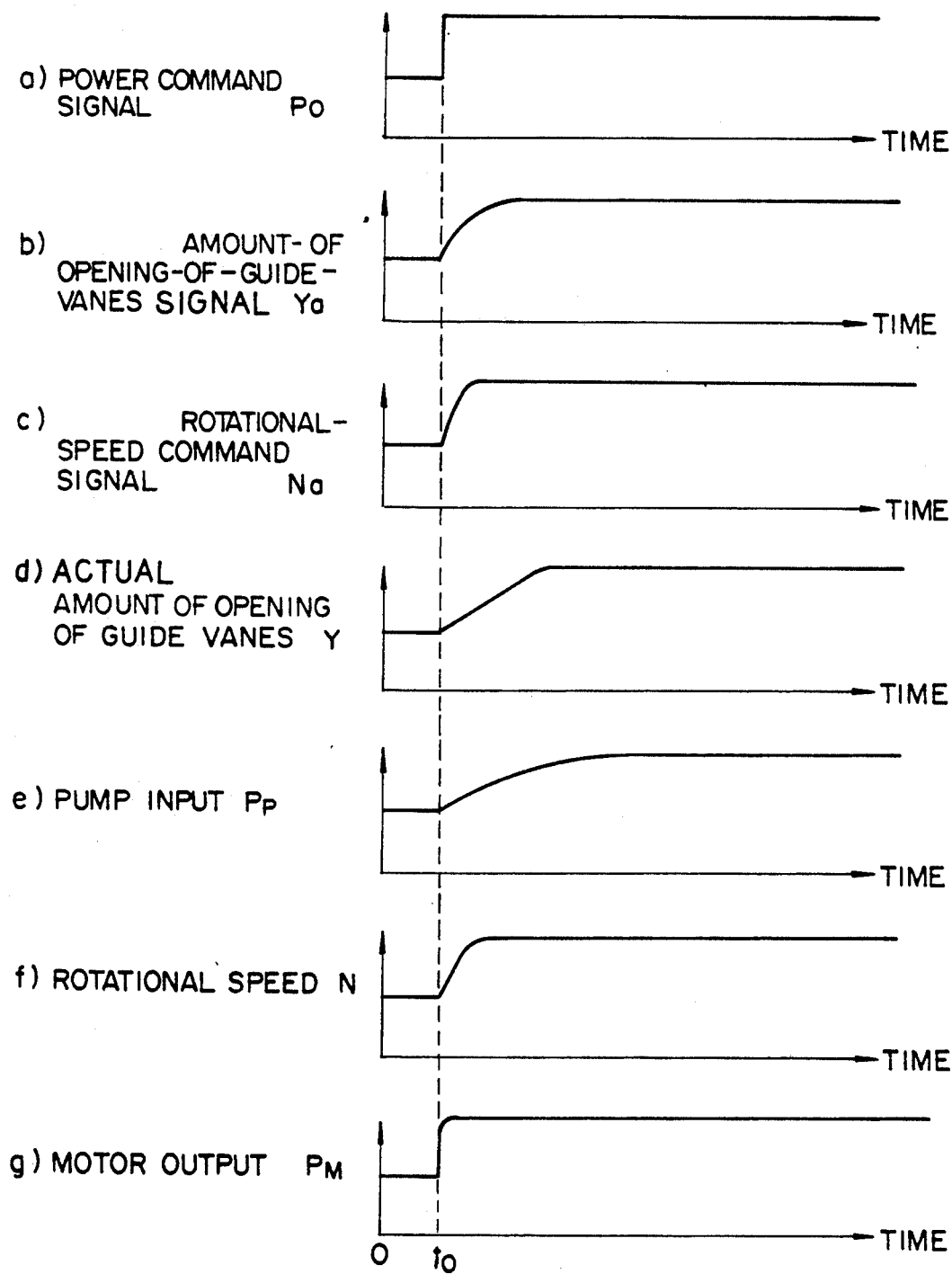
FIG. 2 is a diagram of waveforms showing responses of various signals in the embodiment of FIG. 1.

Firstly, the manner in which the individual element or portion of this embodiment responds to the input will be discussed in connection with FIG. 2.

The responses of the individual portions when the power command signal PO from outside is increased stepwise in time, as shown in graph a), are as indicated by graphs b), c), d), e), f) and g).

The output $P_M$ of the electric motor first rises with a slight delay, as indicated by graph g).

The output Ya of the amount-of-opening-of-guide-vanes function generator 60 and the output Na of the rotational speed function generator 50 respond by the time constants peculiarly possessed by the respective function generators and/or the specially given additional time constants, as indicated by the graphs b) and c).

The response of the real amount of opening Y of the guide vanes with respect to Ya of graph b) will be as indicated by graph d). The straight portion of this response indicates that the guide vanes are restricted by the opening speed restriction of the guide vanes servo motor (for example, this restriction is given by the stroke restriction of a distributing valve for guide vane servomotors).

The rotational speed N of the pump turbine 4 is accelerated by the difference between the motor output $P_M$ of graph g) and the pump input (or the mechanical load) Pp of graph e), increases as graph f) and finally terminates increasing when N reaches Na.

The pump input Pp increases, as indicated by graph e), as the increment due to both the increase of the amount of opening Y of the guide vanes and the increase of the rotational speed N.

In graph f), the movement of the rotational speed N is stable as subjected to the adequate dumping action of the power correction signal generator 16. This can be accomplished for example by constituting the power correction signal generator 16 by a parallel circuit of a proportional element and an integrating element and by selecting suitable gains of these elements.

The the operation of the variable-speed pump system of this will now be described in detail, along with analysis of operations of pumping mode of this plant. In the following description, every variable is a dimensionless regular value and is displayed by a lowercase letter so as to distinguish from a variable with unit disignated using uppercase letters.

Figure 3:
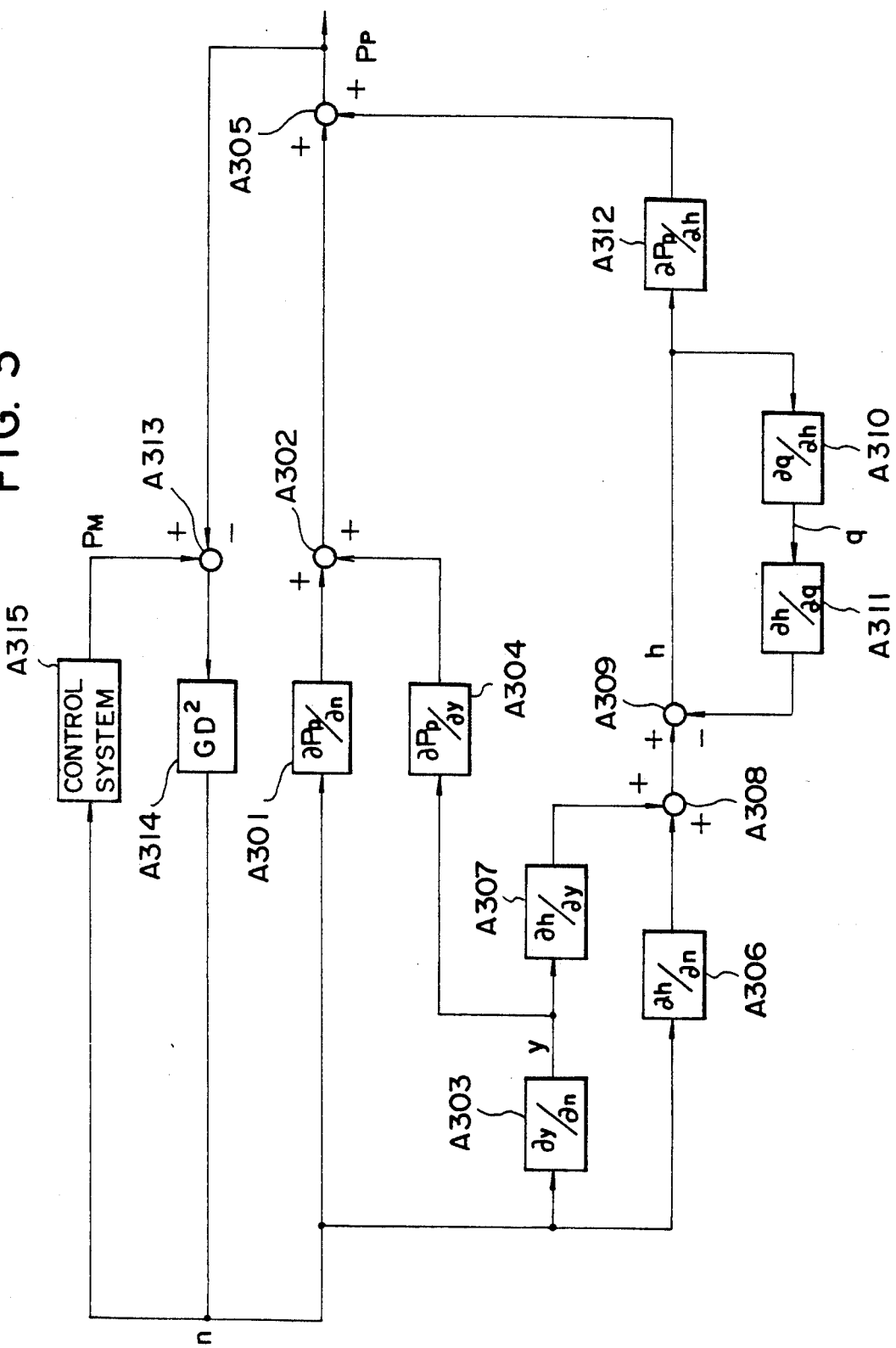
FIG. 3 is a block diagram showing the operation analysis of the variable-speed pump system.

FIG. 3 is a block diagram showing the analysis of pumping mode operation of the system of FIG. 1. FIG. 3 diagrammatically shows only response gains of the respective blocks of the system for simplification, and there might be some inconsistency with fact transfer functions in the system. In FIG. 3, a partial differential in each of blocks A301, A304, A303, A307, A306, A310, A311, A312 represent only the gain rather than the whole transfer function of the individual block.

FIG. 3, the blocks A301 and A302, and a set of the blocks A304–A314 represent peculiar portions of the system such as the pump turbine 4 of FIG. 1 and the pump input Pp, and the signal transmission element constituted by a loop of the moment of inertia $GD^2$ and the rotation speed N.

On the other hand blocks A303 and A315 represent other control systems, i.e., the power control system, the rotational speed control system and guide the vanes control system.

The block A301 represents a characteristic peculiar to the pump, i.e., a proportional of the change of the pump input Pp to the change of the rotational speed n, which gain is $(\partial Pp/\partial n)$.

The block A303 represents the change of the amount of opening y of the guide vanes to the change of n; this is, the block A303 means $(\partial y/\partial n)$. This is equal to $(\partial y/\partial t)(\partial t/\partial n)$ and, therefore, is equal to the product of response $(\partial y/\partial t)$ of the amount of opening of the guide vanes, which is a flow adjusting means, and the inverse number of response $(\partial n/\partial t)$ of the rotational speed control system. Therefore, it will be a response as a composite function of $(\partial y/\partial t)$ and $(\partial n/\partial t)$, irrespective of the construction of these two control systems.

The block A304 represents the change of Pp with respect to the change of y, which is a characteristic peculiar to the pump turbine 4. Its gain is $(\partial Pp/\partial y)$.

Figure 8:
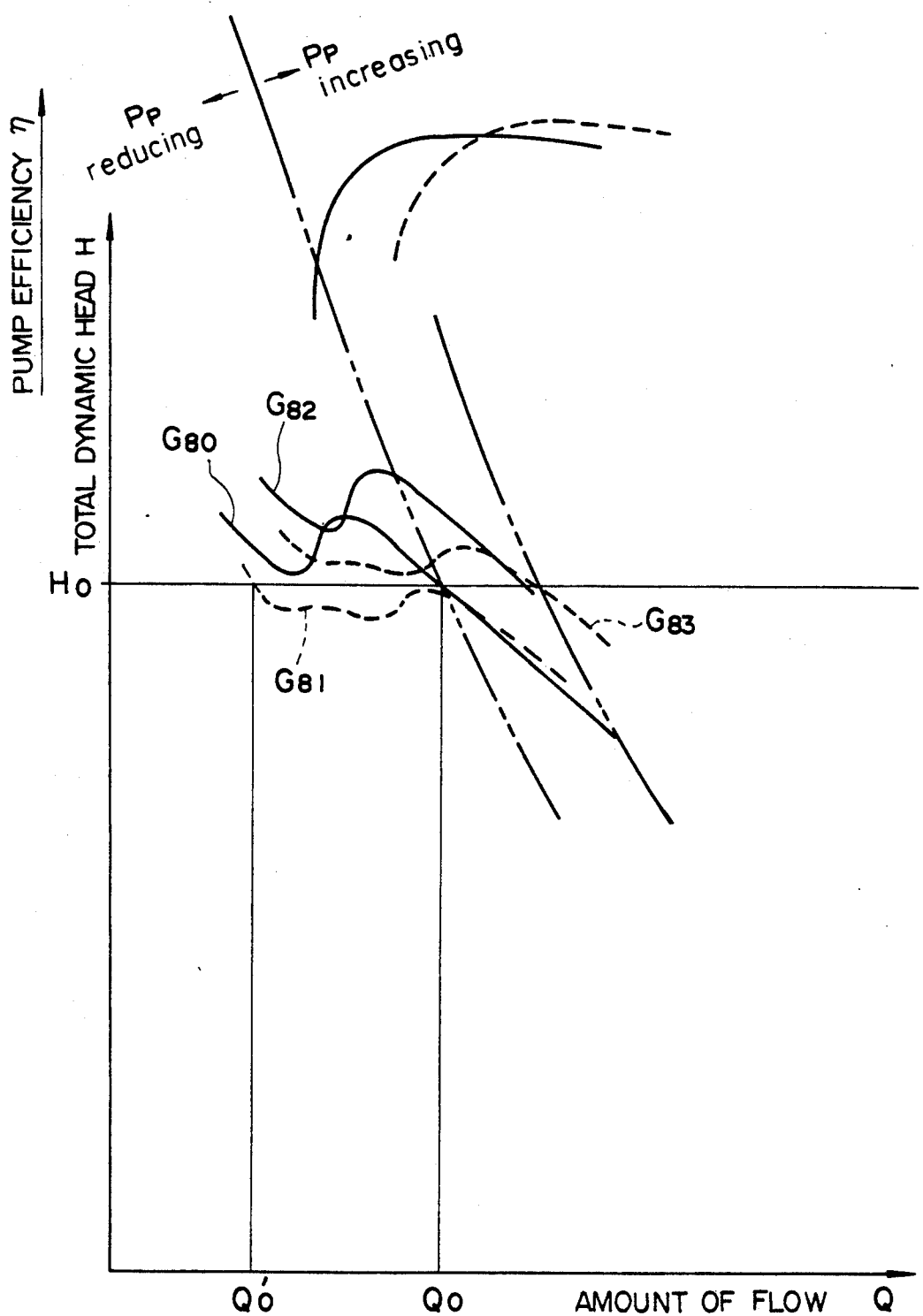
FIG. 8 is another characteristic graph showing the relation between the total dynamic head and the amount of flow of a pump.

The block 307 represents the the block 307 represents the product of $\delta q/\delta y$ which is the flow characteristic of the pump with respect to the change of Y, and $\delta h/\delta q$ which is the change of the dynamic head with respect to the change of the flow which is a value peculiar to the pipelines extending to the upper reservoir and to the lower reservoir from the pump. As shown in FIG. 4, $\delta q/\delta y$ is usually negative, while $\delta h/\delta q$ is positive, that is, $\delta h/\delta y$ usually has a negative value. The block 310 represents the product of $\delta q/\delta n$, the characteristics of the pump with respect to the change of N and $\delta h/\delta q$ as defined above. Since $\delta q/\delta n$ always has a positive value as shown in FIG. 8, the block 310 is always positive.

The block A310 will be a simulation according to the rigid column theory at a portion where the total dynamic head h changes into the flow q. Its gain is $(\not\equiv q/\partial h)$.

The block A312 is a simulation of the portion where the pump input Pp is reduced (increased) due to the rising (lowering) of the total dynamic head h. Its gain is $(\partial Pp/\partial h)$ shown in FIG. 4.

The block A302 sums the output of the block A301 and the output of the block A304; that is, the direct change of Pp with respect to the change of n is combined with the change of Pp with respect to the change of y.

The block A305 adds the result of summing of the block A302 with the output of the block A312. Namely, the direct change of Pp with respect to the direct change of n, the change of Pp with respect to the change of y and the change of Pp due to the change of the total dynamic head, according to the water hammer phenomenon are totalized so that the pump input in the pump turbine 4 can be obtained.

The pump input Pp is compared with the drive output $P_M$ of the generator-motor 2 by the adding portion A313, which difference will in turn become the rotational speed n via the block A314 which represents the integrating operation due to the inertial effect ($GD^2$).

The blocks A302, A305, A308 and A309 represent mere adding portions.

In FIG. 3, even if the control system included in the block A315 alone is adequate, the stability of the whole control system will impaired when the pump, which is an object to be controlled, presents a transitionally undesirable characteristic upon receipt of influence of partial reverse flow characteristics.

If the response time constant of the real mechanical input of the pump is markedly larger than the response time constant of the motor drive output with respect to the output adjusting command signal, which time constant is of main concern of this invention, the rotational speed n varies relatively quickly in response to the command signal. In that case, since transitionally the total dynamic head h also is varied sharply, the pump tends to fall into the partial reverse flow characteristics, for a reason described below.

When the pump falls into partial reverse flow characteristics, some characteristics peculiar to the pump will be reversed or shifted drastically in the block diagram of FIG. 3 so that stable operation can no longer be achieved. This causes great vibrations and deteriorates even the safety of the system.

In this invention, the pump control which does not give any undesirable influence, and particularly the control of the guide vanes y will be given in relation with Pp and n. In this invention, controllable variables y and n are controlled intelligently.

With relation to Pp and n, when n is increased (lowered), y is set so as to satisfy the following discriminant (l) to increase (reduce) the pump input Pp uniformly.

For this purpose, in order that the uniform increase (reduction) of Pp at least at the adding portion A302 is retained by the increasing (lowering) of n.

Although the pump's peculiar characteristic $\delta p_p/\delta y$ is usually negative, and accordingly, the output from the block A304, i.e., the product of $\delta y/\delta n$ and $\delta p_p/\delta y$ is negative, the output from the block A302 can be ensured as a positive value by sufficiently reducing the opening speed of Y, i.e., dy/dt compared with the increasing speed of n, i.e., dn/dt. On the other hand, when the pump input is increased, the thus determined value of dn/dt results in an increasing of the flow while dy/dt usually results in a decreasing of the flow, and they, in turn, result in positive and negative water hammers respectively through the block A307 and the block A306. According to this invention, the sum of the output from the block A307 and that from the block A306 is kept positive. As a consequence of the positive water hammer at the block A308, a negative power change occurs at the output of the block A312, since the block A312 usually has negative characteristics. However, the width (amount of change) of the negative output from the block A312 will never exceed the width of the positive change from the block A302, and accordingly, the difference therebetween will be output from the block A305, i.e., Pp. This is because of the negative feedback which consists of the blocks A313 and A314.

In spite of the above, if dy/dt is set excessively high compared with dn/dt when the pump output is to be increased, the width of the output A307 may be come too large, and the output A308 may turn to negative which results in a positive power change at the output from the block A312. Although the positive power change from the block A312 may at first seem to be a welcome factor, it actually gives an unstable influence to the system as it disappears immediately because it is caused by the water hammer phenomenon. That is why the following discriminant (3) is required.

To summarize the above discussion about the discriminants (1), (2) and (3): (A) the discriminant (1) is required although it can naturally be satisfied; (B) the discriminant (2) is required to maintain the minimum required pump input gain; (C) the discriminant (3) is required to suppress the bad influence from the water hammer. As will be apparent from the above, controlling y with respect to n is very important.

The reason for this may be considered to be that the discriminants (2) and (3) include a common factor ($\partial y/\partial n$) and have close connection with each other in operation of the system. Using the conditions of location of the real pumped storage power plant, the present inventor(s) made tests under the assumption that the variable-speed pump system of this embodiment be adapted to these conditions, and found that when both of discriminants (2) and (3) were satisfied, the system was stable. The inventors also found, that if the discriminant (3) is satisfied, the discriminant (2) is usually satisfied as well. Therefore, y and/or n may be controlled so as to satisfy at least one of the discriminants (2) and (3).

$$\frac{\partial P_P}{\partial n} + \frac{\partial y}{\partial n} \cdot \frac{\partial P_P}{\partial y} + \frac{\partial P_P}{\partial h}\left(\frac{\frac{\partial y}{\partial n} \cdot \frac{\partial q}{\partial y}}{\frac{\partial q}{\partial h}} + \frac{\frac{\partial q}{\partial n}}{\frac{\partial q}{\partial h}}\right) = \tag{1}$$

$$\left(\frac{\partial P_P}{\partial n} + \frac{\partial y}{\partial n} \cdot \frac{\partial P_P}{\partial y}\right) + \frac{\partial P_P}{\partial h}\left(\frac{\partial y}{\partial n} \cdot \frac{\partial h}{\partial y} + \frac{\partial h}{\partial n}\right) > 0$$

$$\frac{\partial P_P}{\partial n} + \frac{\partial y}{\partial n} \cdot \frac{\partial P_P}{\partial y} > 0 \tag{2}$$

$$\frac{\partial y}{\partial n} \cdot \frac{\partial h}{\partial y} + \frac{\partial h}{\partial n} > 0 \tag{3}$$

If y and/or n are controlled so as to satisfy at least one of discriminants (2) and (3), it is possible to achieve stable operation, irrespective of the presence of the partial reverse flow characteristics peculiar to the pump.

Thus the stable operation can be accomplished by setting the response (dy/dt) of the amount-of-opening-of-guide-vanes control system and the response (dn/dt) of the rotational speed control system so as to satisfy the above discriminants.

Figure 6:
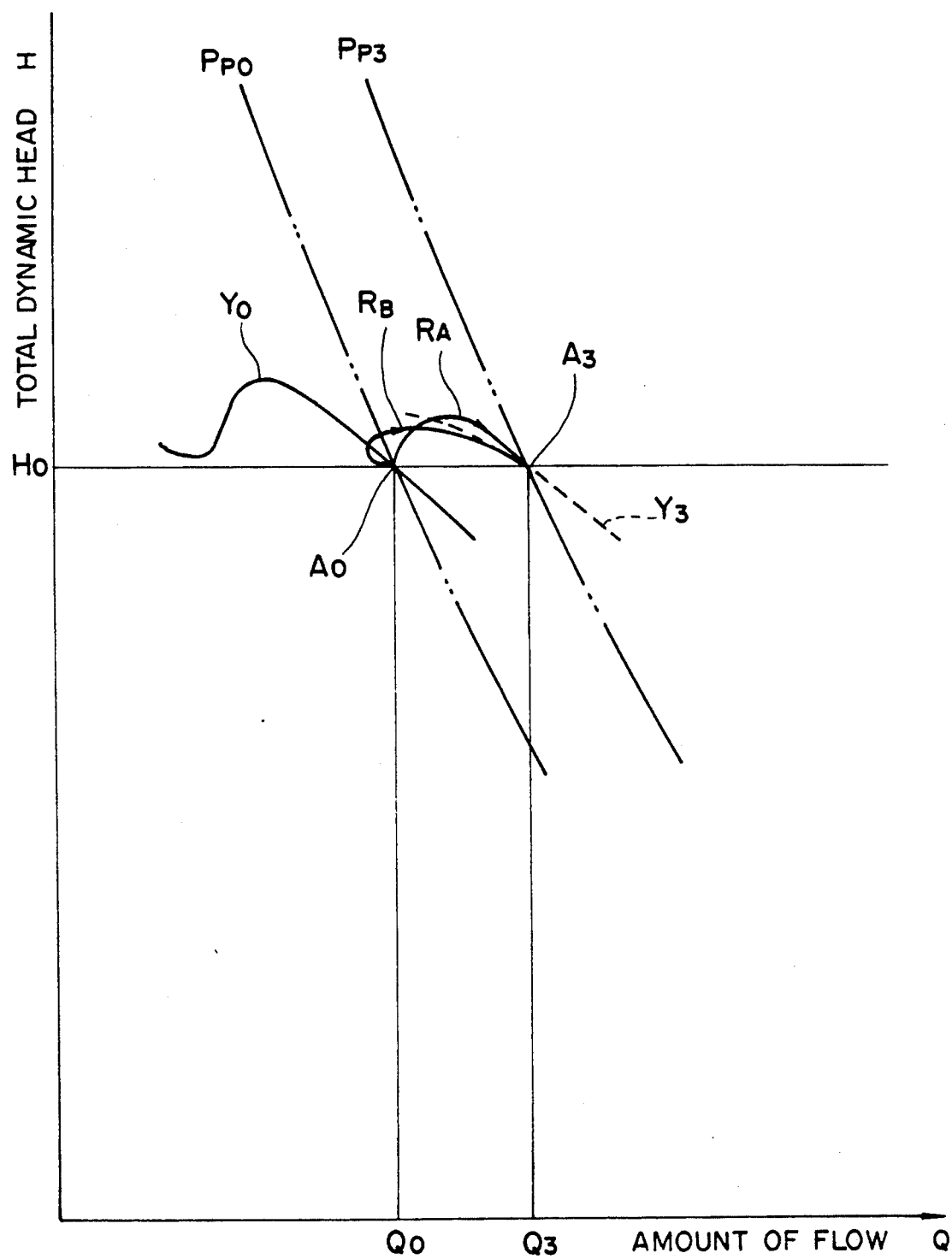
FIGS. 6 and 7 are characteristic graphs showing the movements of operating points respectively while the input of a pump is increasing and is being reduced.

In FIG. 6, the drive output of the electric motor is increased from PpO to Pp3 under the total dynamic head HO (pipe-loss is neglected for clarity).

The point of operation moves from A0 to A3. At that time, if it moves along the path RB, the pump input is temporarily reduced below PpO, which does not satisfy the discriminant (2) and hence the pump may possibly drop into the reverse flow characteristic region, similar to the case of the flow reduction from Qo to Q'o in FIG. 8.

To the contrary, safety can be achieved if the point of operation is moved along the path RA.

The drive output of the electric motor is increased from PpO to Pp3 as n increases; and then the amount of opening Y of the guide vanes is increased from YO to Y3 to achieve an optimum guide vase opening control.

The foregoing description of the operation will be expanded in connection with FIG. 8.

The graph G80 is a graph showing the relation between H and Q under the conditions of the rotational speed No and the amount of opening YO of the guide vanes, which correspond to the pump input PpO. The graph G81 is a graph showing the relation between H and Q under the conditions of the rotational speed No and the amount of opening Y1 of the guide vanes (excessively larger than the optimum amount of opening YO when the rotational speed is No). In the graph G81, when the total dynamic head H=H$_O$, Y is overopened so that the pump falls into the reverse flow characteristics (around the peak value) and the amount of flow is lowered sharply from Q0 to QO'.

Turning back to FIG. 6, in the case of moving path RB, the guide vanes are excessively opened during opening so that the pump tends to fall into the reverse flow characteristics. In either the path RA or the path PB, H>Ho during moving. This shows that there is a transitional rise of H due to the water hammering in the pipe.

Figure 7:
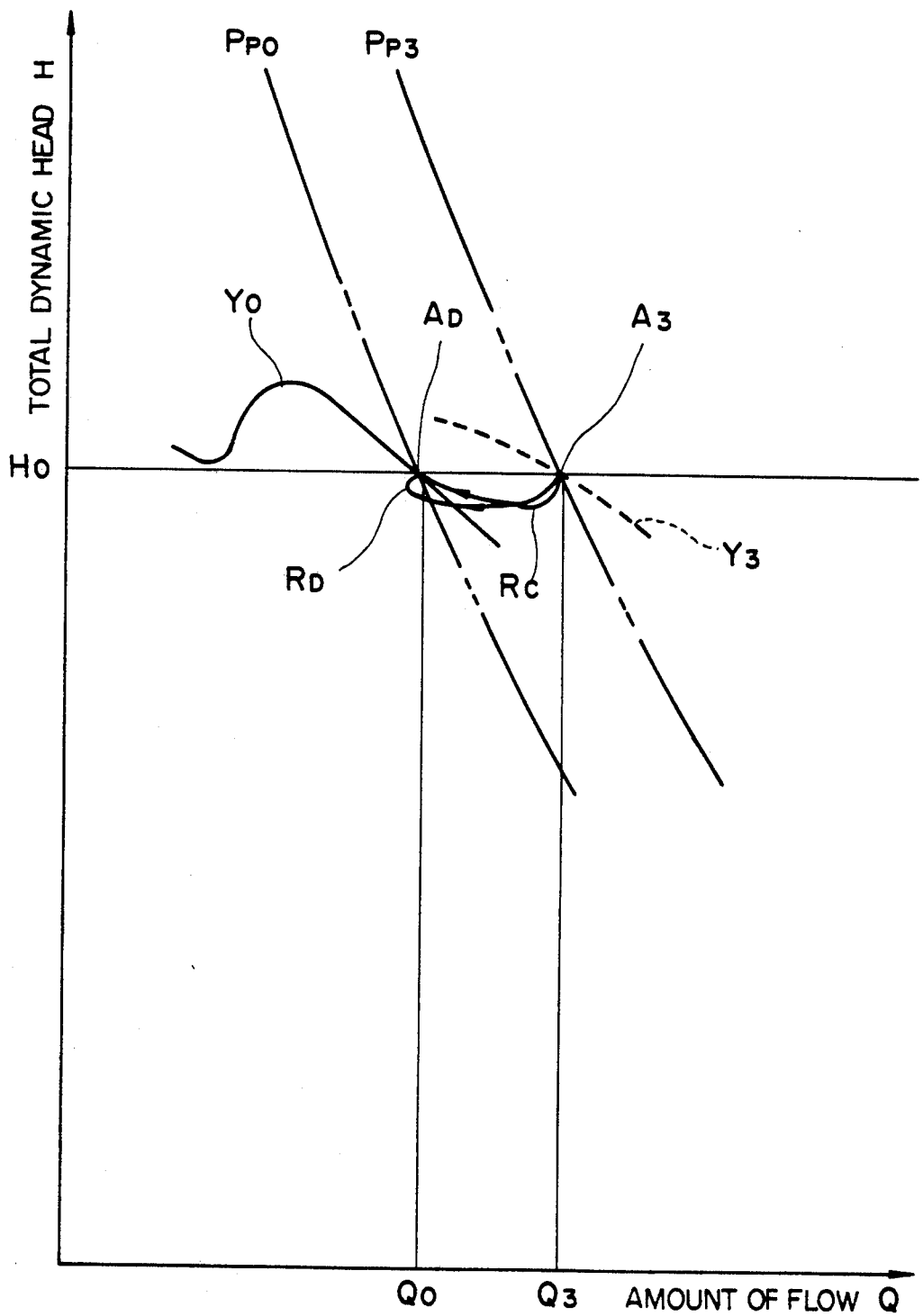

FIG. 7 shows the reverse movement of the point of operation from A3 to A0. In the case of the path RC there is no overshoot. In the case of the path RD, the reducing of the amount of opening of the guide vanes is delayed, compared to the lowering of the rotational speed so that these is the overshoot in the path. Also in this case, the point of operation likely approaches (or falls below) the reverse flow characteristics, which is undersirable.

When lowering the pump input, the quantity of flow is reduced so that the of course water hammering lowers H. Namely, H<H0 while the point of operation is moving.

In this embodiment, the object is a variable speed pump of the type in which the output of the motor is controlled in very high-speed response to the demand of the power system. In this case, the output of the motor must be controlled at high speed, irrespective of the real operation state (N or Y) of the pump. Therefore, as shown in FIG. 1, the real motor output PM is detected, and must directly follow the motor output command signal (PO+$\epsilon$) (where $\epsilon$ changes slowly because of a long time constant in the rotational speed function generator 50 and almost zero at beginning of changing.) Further, the response time constant of the motor control system 32 must be markedly smaller, compared to the response time constant of the other N or Y control system.

In this type of pump system in which $P_M$ is controlled earlier or faster than any other control, the rotational speed command signal Na or the amount-of-opening-of-guide vanes' command signal Ya will naturally be calculated more slowly by function generators in which the output command signal $P_O$, the real output $P_M$ or their equivalent signals can be used as their inputs.

As described above, for stable operation, when increasing $P_M$, it is necessary to have N's increasing response speed higher than Y's increasing response speed. When lowering $P_M$, it is necessary to have Y's lowering response speed higher than N's lowering response speed. Accordingly, a fixed system in which either the Y control or the N control is assigned to a master control irrespective of direction of change while the other is assigned to a slave control is not suitable.

Assuming that the output command signal $P_O$ is repeatedly quickly increased and lowered, either the N response or the Y response should not be slow like the prior art. Otherwise, the point of operation will deviate progressively deviates from the correct point. More particularly, if the difference between the increasing and lowering response speeds of Y is too large, such fear would become great.

To this end, in this invention, the limit in the control of the rotational speed N and the amount of opening Y of the guide vanes is set so as to not to be encountered with that fear. In the foregoing embodiment, this limit is set by the function generators 50, 60 of FIGS. 9 through 14.

According to this invention, since the method theoretically avoids the pump from falling into the reverse flow characteristics, it is possible to increase the speed of opening the guide vanes, when increasing the pump input, to the maximum possible limit, and to increase the speed of lowering the rotational speed, when lowering the pump input, to the maximum possible limit as well.

As obvious from the foregoing, the above maximum possible limits can be determined by either or both of the following:

$$\frac{\delta v}{\delta n} \cdot \frac{\delta p_p}{\delta y} + \frac{\delta p_p}{\delta n} = 0 \qquad (4)$$

$$\frac{\delta v}{\delta n} \cdot \frac{\delta h}{\delta y} + \frac{\delta h}{\delta n} >= 0 \qquad (5)$$

As a result, the dissociation phenomenon is avoided so that a variable-speed pumping operation which renders services of the electric power system to the highest response.

Figure 15:
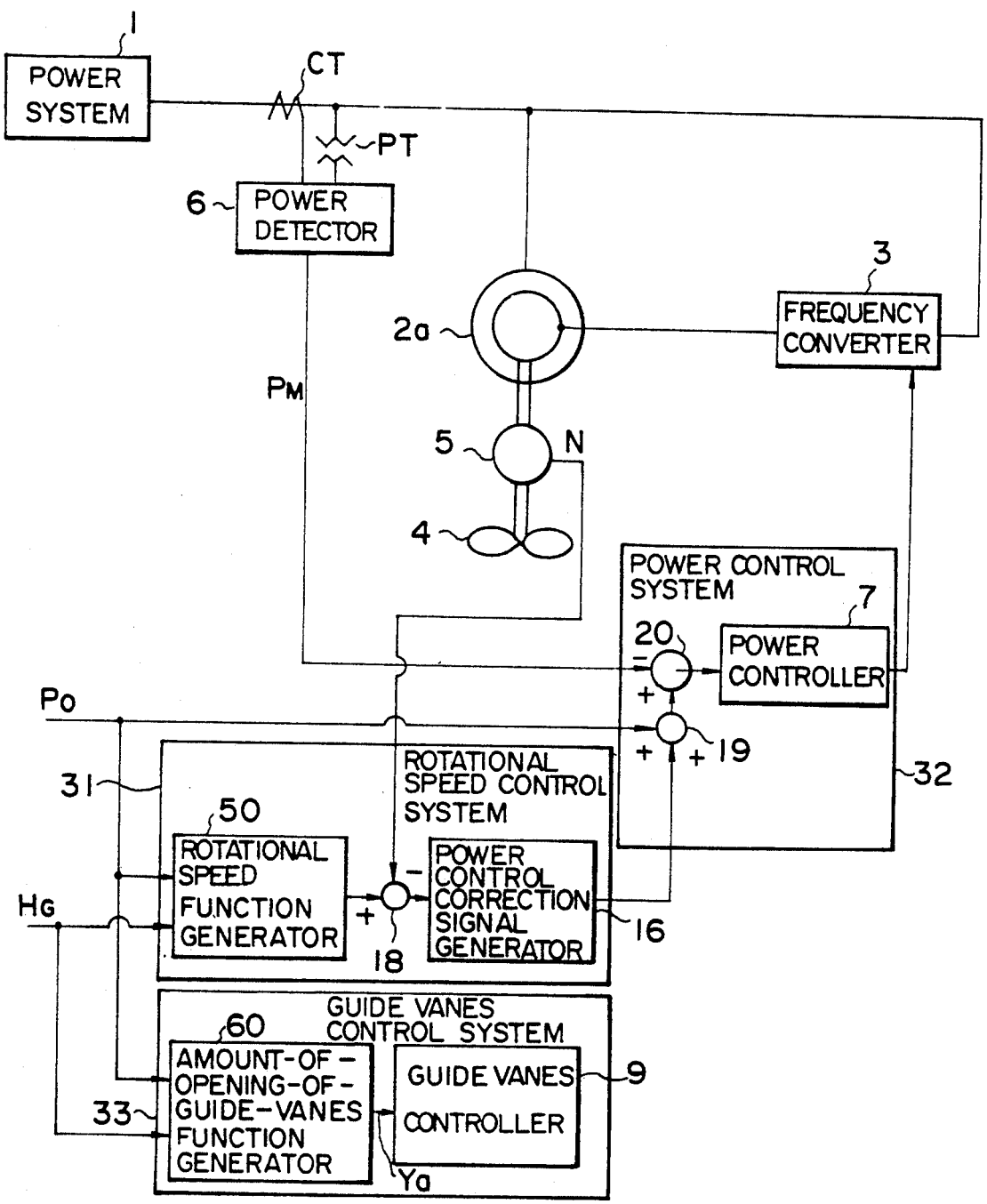
FIG. 15 is a block diagram showing another embodiment in which a variable-speed pump system of the invention is applied to a pumped storage power plant.

FIG. 15 shows another embodiment in which a wound-rotor induction machine 2a is used, as a generator-motor, in a pumped storage power plant having a variable-speed pump system. The wound-rotor induction machine 2a drives the pump turbine 4 to perform pumping. Like reference numerals designate similar parts or elements throughout this and the foregoing embodiments.

The wound-rotor induction machine 2a is connected at its primary side to the electric power system 1 and at its secondary side to the frequency converter 3. The input of the induction machine 2a is increased and reduced according to the phase command signal of the a.c. exciting current by the frequency converter. The real input $P_M$ is detected by the electric power detector 6 and is inputted to the adder 20; and the real rotational speed N is detected by the rotational speed detector 5 and is inputted to the adder 18.

The control system includes: the rotational speed control system 31 composed of the rotational speed function generator 50, the adder 18 and the electric power correction signal generator 16; the electric power control system 32 composed of the adder 19, 20 and the electric power controller 7; and the guide vanes control system 33 composed of the amount-of-opening-of-guide-vanes function generator 60 and the guide vanes controller 9. FIG. 15 shows no feedback of a signal indicating the real amount of opening of the guide vanes, but this does not deny the feedback. The same comment applies to the guide vanes control system 33 of FIG. 16.

The pumped storage power plant of this embodiment has a first operation mode in which, to receive electric power from the electric power system 1, the pump turbine 4 is driven, as a pump, by the induction machine 2a to perform pumping action and acts as a load to absorb the electric power of the electric power system 1, and a second operation mode in which, reversely, the induction machine 2a is driven, as a generator, by the turbine 4 and acts so as to supply the electric power to the electric power system 1.

In the first operation mode, receiving the electric power of a substantially constant frequency from the electric power system 1, the induction machine 2a is controlled by the rotational speed control system 31 in such a manner that the rotational speed varies according to the state of operation. Further, the amount of flow of the pump turbine 4 is controlled by the guide vanes control system 33. The pump turbine 4 is driven by the induction machine 2a. In that case, when increasing the output of the induction machine 2a by the electric power command signal from outside, the maximal value of the increasing speed of the flow increasing command signal in the guide vanes control system 33 is set to be smaller, compared to the maximal value of the increasing speed of the rotational speed increasing command signal in the rotational speed control system 31.

When reducing the output of the induction machine 2a by the power command signal from outside, the maximal value of the lowering speed of the rotational speed lowering command signal in the rotational speed control system 31 is set to be smaller, compared to the maximal value of the reducing speed of the flow reducing command signal in the guide vanes control system 33.

Owing to the above adjustments, the electric motor of the induction machine 2a can be operated stably so as to follow the increasing and lowering of the electric power command signal.

Figure 16:
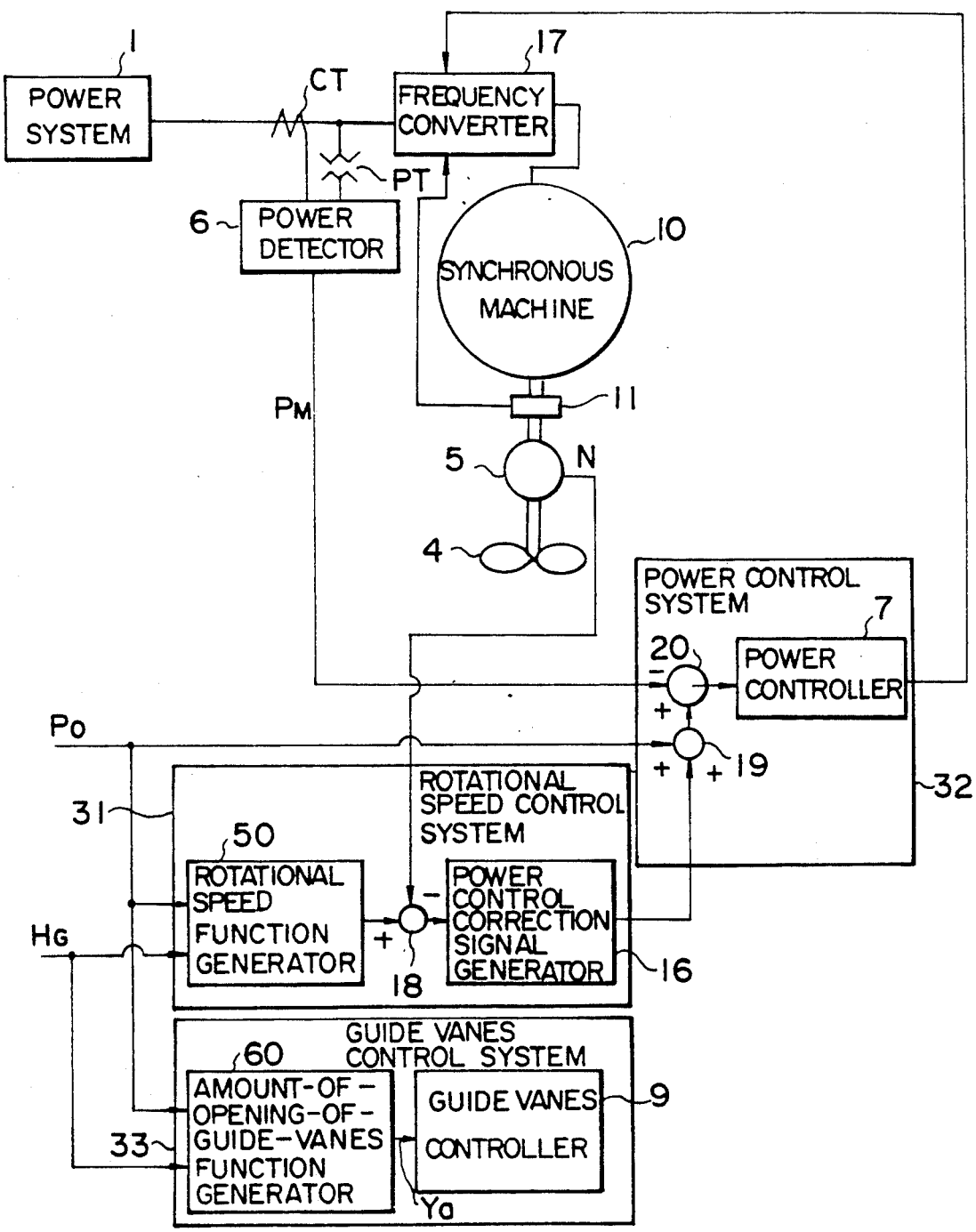
FIG. 16 is a block diagram similar to FIG. 15, showing another example.
Figure 17:
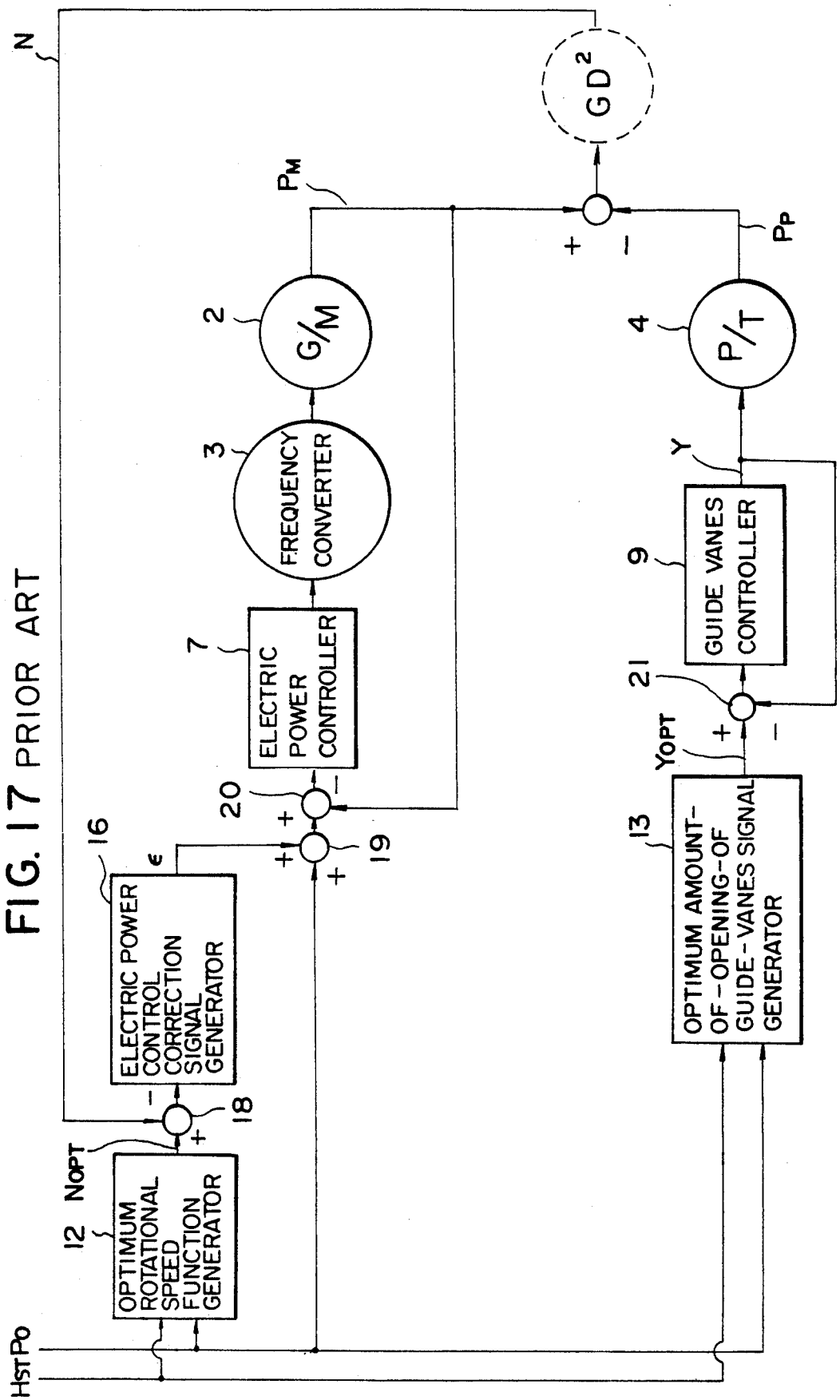
FIG. 17 is block diagram showing a prior art variable-speed pump system.

FIG. 16 shows still another embodiment in which a synchronous machine is used, as a generator-motor, in a pumped storage power plant having a variable-speed pump system.

In this embodiment, the frequency converter 17 is disposed between the system 1 and the synchronous machine 10, the synchronous machine 10 is operated, as a generator-motor, to drive the pump turbine 4, thereby performing pumping generation. Like reference numerals designate similar parts or elements throughout this and the foregoing elements.

Further, this embodiment has the phase detector 11 so as to match with the phase command signal to the frequency converter 17. Based on the detection signal of this phase detector 11, the frequency converter 17 drives the synchronous machine 10. The real input $P_M$ is detected by the power detector 6 and is inputted to the adder 20, and the real rotational speed N is detected by the rotational speed detector 5 and is inputted to the adder 18.

The other operations are similar to those of the embodiment of FIG. 15, and therefore their description is omitted here for clarity.

The foregoing embodiments are just examples, and this invention should be no means be limited to these specific forms.

For example, in each of the foregoing embodiments, the transitional correcting response is controlled in both the rotational speed function generator and the amount-of-opening-of-guide-vanes function generator; alternatively, this control may be solely performed by any one of these two function generators. Further, in the foregoing embodiments, the power command signal $P_O$ and the static head $H_G$ are used as inputs to the function generators. Other signals equivalent to the power command signal and the static head; for example, real output signals of an electric motor may be used.

Still further, in the foregoing embodiments, the transitional correction responses are controlled in the rotational speed function generator and the amount-of-opening-of-guide-vanes function generator. This invention should be no means be limited to the illustrated embodiments, and these responses may be controlled at a suitable portion of the rotational speed control system and at a suitable portion of the guide vanes control system.

In the foregoing embodiments, a pump turbine is used as the hydraulic machine. For another alternative form, a pump may be used.

To sum up the foregoing, according to the individual embodiment of this invention, it is possible to avoid the partial reverse flow characteristics of the pump and to quickly respond to the requests from the electric power system, while guaranteeing a stable operation and improving the demand-supply balance of electric power.

What is claimed is:

1. A variable-speed pump system comprising:
   (a) a hydraulic machine having a flow adjusting means and including at least a pumping function;
   (b) a rotary machine operatively connected to said hydraulic machine and including at least a motor function for rotating said hydraulic machine;
   (c) a frequency converter for driving said rotary machine; and
   (d) a control system for controlling variable speed operation of said rotary machine according to a command signal from an external unit or a signal corresponding to the command signal,
   (e) said control system including 1) an electric power control system for controlling the output of said rotary machine commensurate with the command signal, 2) a rotational speed control system for outputting a correction signal to said electric power control system in such a manner that said hydraulic machine is rotated at a correct rotational speed with respect to the command signal, and 3) a flow adjustment control system for controlling said flow adjusting means of said hydraulic machine in such a manner that an amount of opening of said flow adjusting means is commensurate with the command signal;
   (f) said electric power control system having a small time constant which is negligible as compared to the time constant of said rotational speed control system;
   (g) at least one of said flow adjustment control system and said rotational speed control system having means for setting a transmission function in such a manner that, under normal operation conditions, a mechanical load of said hydraulic machine is not reduced while the rotational speed thereof is increasing, and that the mechanical load is not increased while the rotational speed is lowering.

2. A variable-speed pump system according to claim 1, wherein said flow adjustment control system has means for setting a maximum value of an increasing speed of a low increasing command signal to be smaller than a maximum value of increasing speed of a rotational speed increasing command signal in said rotational speed control system when an output of said rotary machine is increased by said command signal, and means for setting a maximum value of lowering speed of a flow reducing command signal in said flow adjustment control system to be larger than a maximum value of decreasing speed of a rotational speed lowering command signal in said rotational speed control system when an output of said rotary machine is lowered by the command signal.

3. A variable-speed pump system according to claim 1, wherein said flow adjustment control system has means for setting a maximum value of a flow increasing command signal to be smaller than a maximum value of increasing speed of a rotational speed increasing command signal in said rotational speed control system when an output of said rotary machine is increased by the command signal.

4. A variable-speed pump system according to claim 1, wherein said rotational speed control system has means for setting a maximum value of lowering speed of a flow reducing command signal in said flow adjustment control system when an output of said rotary machine is lowered by the command signal.

5. A variable-speed pump system according to claim 1, wherein said rotary machine is a generator-motor, and said hydraulic machine is a pump turbine.

6. A variable-speed pump system according to claim 1, wherein said rotational speed control system includes:
 (a) a function generating unit for outputting a target value of optimum rotational speed command signal according to, as said external command signal, an electric power command signal and a static head; and
 (b) a lag element for delaying said target value with a time constant corresponding to the state of operation and for outputting the delayed target value as a rotational speed command signal, said lag element having a transmission element for giving a large response speed when the rotational speed is to be increased and for giving a small response speed when the rotational speed is to be lowered, whereby said correction signal for correcting the rotational sped is issued based on a difference between a rotational speed corresponding to the command outputted from said lag element and a real rotation speed.

7. A variable-speed pump system according to claim 6, wherein said rotary machine is a generator-motor, and said hydraulic machine is a pump turbine.

8. A variable-speed pump system according to claim 1, wherein said transmission function setting means sets a transmission function such that a response (dy/dt) of said flow adjustment control system and a response (dn/dt) of said rotational speed control system are set in such a manner that at least one of the following inequalities is established:

$$\frac{\delta y}{\delta n} \cdot \frac{\delta p_p}{\delta y} + \frac{\delta p_p}{\delta n} > 0, \text{ and}$$

$$\frac{\delta y}{\delta n} \cdot \frac{\delta h}{\delta y} + \frac{\delta h}{\delta n} > 0$$

wherein y is a dimensionless amount of opening of said flow adjusting means, n is a dimensionless rotational speed of said hydraulic machine, $p_p$ is a dimensionless mechanical load input of a mechanical load of said hydraulic machine, and h is a dimensionless total dynamic head.

9. A variable-speed pump system according to claim 8, wherein said rotary machine is a generator-motor, and said hydraulic machine is a pump turbine.

10. A variable-speed pump system according to claim 1, wherein said transmission function setting means sets a transmission function such that a response (dy/dt) of said flow adjustment control system and a response (dn/dt) of said rotational speed control system are set in such a manner that the following inequality is established:

$$\left(\frac{\delta p_p}{\delta n} + \frac{\delta y}{\delta n} \cdot \frac{\delta p_p}{\delta y}\right) + \frac{\delta p_p}{\delta h}\left(\frac{\delta y}{\delta n} \cdot \frac{\delta h}{\delta y} + \frac{\delta h}{\delta n}\right) > 0$$

wherein y is a dimensionless amount of opening of said flow adjusting means, n is a dimensionless rotational speed of said hydraulic machine, $p_p$ is a dimensionless mechanical load input of a mechanical load of said hydraulic machine, and h is a dimensionless total dynamic head.

11. A variable-speed pump system according to claim 10, wherein said rotary machine is a generator-motor, and said hydraulic machine is a pump turbine.

12. A variable-speed pump system according to claim 1, wherein said flow adjusting means has guide vanes, said flow adjustment control system including:
 (a) a function generating unit for outputting a target value of optimum amount-of-opening-of-guide-vanes command signal according to, said external command signal, an electric power command signal and a static head; and
 (b) a lag element for delaying said target value with a time constant corresponding to the state of operation and for outputting the delayed target value as an amount-of-opening-of-guide-vanes command signal, said lag element having a transmission element for giving a small response speed when the amount-of-opening-of-guide-vanes is to be increased and for giving a large response speed when the amount-of-opening-of-guide-vanes command signal is to be lowered, whereby a correction signal for correcting the amount of opening of said guide vanes is controlled based on a difference between an amount-of-opening-of-guide-vanes corresponding to the amount-of-opening-of-guide-vanes command signal and a real amount of opening of said guide vanes.

13. A variable-speed pump system according to claim 12, wherein said rotary machine is a generator-motor, and said hydraulic machine is a pump turbine.

14. A variable-speed pump system comprising:
 (a) a hydraulic machine having a flow adjusting means and including at least a pumping function;
 (b) a rotary machine operatively connected to said hydraulic machine and including at least a motor function for rotating said hydraulic machine;
 (c) a frequency converter for driving said rotary machine; and
 (d) a control system for controlling variable speed operation of said rotary machine according to a command signal from an external unit or a signal corresponding to the command signal, said control system including 1) an electric power control system for controlling the output of said rotary machine commensurate with the command signal and a correction signal, 2) a rotational speed control system for outputting the correction signal to said electric power control system in such a manner that said hydraulic machine is rotated at a correct rotational speed with respect to the command signal, and 3) a flow adjustment control system for controlling said flow adjusting means of said hydraulic machine in such a manner that an amount of opening of said flow adjusting means is commensurate with the command signal;
 (e) said electric power control system having a small time constant which is negligible as compared to the time constant of said rotational speed control system;
 (f) a response (dy/dt) of said flow adjustment control system and a response (dn/dt) of said rotational speed control system being set in such a manner that at least one of the following inequalities is established:

$$\frac{\delta y}{\delta n} \cdot \frac{\delta p_p}{\delta y} + \frac{\delta p_p}{\delta n} > 0, \text{ and}$$

$$\frac{\delta y}{\delta n} \cdot \frac{\delta h}{\delta y} + \frac{\delta h}{\delta n} > 0$$

wherein y is a dimensionless amount of opening of said flow adjusting means, n is a dimensionless rotational speed of said hydraulic machine, $p_p$ is a dimensionless mechanical load input of a mechanical load of said hydraulic machine, and h is a dimensionless total dynamic head.

15. A variable-speed pump system according to claim 14, wherein said rotary machine is a generator-motor, and said hydraulic machine is a pump turbine.

16. A variable-speed pump system comprising:
   (a) a hydraulic machine having a flow adjusting means and including at least a pumping function;
   (b) a rotary machine operatively connected to said hydraulic machine and including at least a motor function for rotating said hydraulic machine;
   (c) a frequency converter for driving said rotary machine; and
   (d) a control system for controlling variable speed operation of said rotary machine according to a command signal from an external unit or a signal corresponding to the command signal, said control system including 1) an electric power control system for controlling the output of said rotary machine commensurate with the command signal and a correction signal, 2) a rotational speed control system for outputting the correction signal to said electric power control system in such a manner that said hydraulic machine is rotated at a correct rotational speed with respect to the command signal, and 3) a flow adjustment control system for controlling said flow adjusting means of said hydraulic machine in such a manner that an amount of opening of said flow adjusting means is commensurate with the command signal;
   (e) said electric power control system having a small time constant which is negligible as compared to the time constant of said rotational speed control system;
   (f) a response (dy/dt) of said flow adjustment control system and a response (dn/dt) of said rotational speed control system being set in such a manner that the following inequality is established:

$$\left( \frac{\delta p_p}{\delta n} + \frac{\delta y}{\delta n} \cdot \frac{\delta p_p}{\delta y} \right) + \frac{\delta p_p}{\delta h} \left( \frac{\delta y}{\delta n} \cdot \frac{\delta h}{\delta y} + \frac{\delta h}{\delta n} \right) > 0$$

wherein y is a dimensionless amount of opening of said flow adjusting means, n is a dimensionless rotational speed of said hydraulic machine, $p_p$ is a dimensionless mechanical load input of a mechanical load of said hydraulic machine, and h is a dimensionless total dynamic head.

17. A variable-speed pump system according to claim 16, wherein said rotary machine is a generator-motor, and said hydraulic machine is a pump turbine.

18. A variable-speed pump system according to claim 16, wherein said flow adjustment control system has means for setting a maximum value of an increasing speed of a flow increasing command signal to be smaller than a maximum value of increasing speed of a rotational speed increasing command signal in said rotational speed control system when an output of said rotary machine is increased by said command signal, and means for setting a maximum value of lowering speed of a flow reducing command signal in said flow adjustment control system to be larger than a maximum value of decreasing speed of a rotational speed lowering command signal in said rotational speed control system when an output of said rotary machine is lowered by the command signal.

19. A variable-speed pump system according to claim 16, wherein said flow adjustment control system has means for setting a maximum value of a flow increasing command signal to be smaller than a maximum value of increasing speed of a rotational speed increasing command signal in said rotational speed control system when an output of said rotary machine is increased by the command signal.

20. A variable-speed pump system according to claim 16, wherein said rotational speed control system has means for setting a maximum value of lowering speed of a flow reducing command signal in said flow adjustment control system when an output of said rotary machine is lowered by the command signal.

21. A variable-speed pump system, comprising:
   (a) a hydraulic machine for pumping having a flow adjusting means;
   (b) a motor means operatively connected to said hydraulic machine;
   (c) a control system for controlling variable speed operation of said motor means according to a command signal, said control system comprising:
      (1) an electric power control system for controlling an output of said motor means commensurate with the command signal;
      (2) a rotational speed control system for outputting a correction signal to said electric power control system, said correction signal for correcting a rotating speed of said motor means to be commensurate with the command signal; and
      (3) a flow adjustment control system for controlling said flow adjusting means of said hydraulic machine such that an amount of opening of said flow adjusting means is commensurate with the command signal;
   wherein at least one of a change in an opening of said flow adjusting means and a rotational speed of said motor means is controlled by said control system such that at least one of the following inequalities is established:

$$\frac{\delta y}{\delta n} \cdot \frac{\delta p_p}{\delta y} + \frac{\delta p_p}{\delta n} > 0, \text{ and}$$

$$\frac{\delta y}{\delta n} \cdot \frac{\delta h}{\delta y} + \frac{\delta h}{\delta n} > 0, \text{ and}$$

$$\left( \frac{\delta p_p}{\delta n} + \frac{\delta y}{\delta n} \cdot \frac{\delta p_p}{\delta y} \right) + \frac{\delta p_p}{\delta h} \left( \frac{\delta y}{\delta n} \cdot \frac{\delta h}{\delta y} + \frac{\delta h}{\delta n} \right) > 0$$

wherein y is a dimensionless amount of opening of said flow adjusting means, n is a dimensionless rotational speed of said hydraulic machine, $p_p$ is a dimensionless mechanical load input of a mechanical load of said hydraulic machine, and h is a dimensionless total dynamic head.

22. A variable-speed pump system according to claim 21, wherein said rotational speed control system includes:

(a) a function generating unit for outputting a target value of optimum rotational speed command signal according to said command signal and a static head; and (b) a lag element for delaying said target value with a time constant corresponding to a state of operation and for outputting the delayed target value as a rotational speed command signal, said lag element having a transmission element for giving a large response speed when the rotational speed is to be increased and for giving a small response speed when the rotational speed is to be lowered, whereby said correction signal for correcting the rotational speed is issued based on a difference between a rotational speed corresponding to the command outputted from said lag element and an actual rotation speed.

23. A variable-speed pump system according to claim 21, wherein said flow adjusting means has guide vanes, said flow adjustment control system including:

(a) a function generating unit for outputting a target value of optimum amount-of-opening-of-guide-vanes command signal according to said command signal and a static head; and (b) a lag element for delaying said target value with a time constant corresponding to the state of operation and for outputting the delayed target value as an amount-of-opening-of-guide-vanes command signal, said lag element having a transmission element for giving a small response speed when the amount-of-opening-of-guide-vanes is to be increased and for giving a large response speed when the amount-of-opening-of-guide-vanes command signal is to be lowered, whereby a correction signal for correcting the amount of opening of said guide vanes is controlled based on a difference between an amount-of-opening-of-guide-vanes corresponding to the amount-of-opening-of-guide-vanes command signal and an actual amount of opening of said guide vanes.

24. A variable-speed pump system according to claim 21, wherein said flow adjusting means comprises adjustable guide vanes.

25. A variable-speed pump system according to claim 21, wherein both a change in an opening of said flow adjusting means and a rotational speed of said motor means is controlled by said control system such that at least one of the following inequalities is established:

$$\frac{\delta y}{\delta n} \cdot \frac{\delta p_p}{\delta y} + \frac{\delta p_p}{\delta n} > 0, \text{ and}$$

$$\frac{\delta y}{\delta n} \cdot \frac{\delta h}{\delta y} + \frac{\delta h}{\delta n} > 0, \text{ and}$$

$$\left( \frac{\delta p_p}{\delta n} + \frac{\delta y}{\delta n} \cdot \frac{\delta p_p}{\delta y} \right) + \frac{\delta p_p}{\delta h} \left( \frac{\delta y}{\delta n} \cdot \frac{\delta h}{\delta y} + \frac{\delta h}{\delta n} \right) > 0.$$

26. A variable-speed pump system according to claim 25, wherein said electric power control system responds to said command signal to control a power output of said motor means in a period of time which is negligible compared to the response time of said rotational speed control system controlling the rotational speed of said motor means.

* * * * *

UNITED STATES PATENT AND TRADEMARK OFFICE
CERTIFICATE OF CORRECTION

PATENT NO. : 5,160,244

DATED : November 3, 1992

INVENTOR(S) : T. KUWABARA et al

It is certified that error appears in the above-identified patent and that said Letters Patent is hereby corrected as shown below:

Column 9, after line 37, insert --The rotational speed function generator 50 of FIG. 10 will now be described. This function generator 50 includes a function generating portion 51, a power command signal judging portion 59 for judging the increasing and lowering of the power command signal PO to control the switching action of a switch portion 55 as described below, and a lag element circuit.

The lag element circuit includes a comparison portion 52, gain element portions 53, 54 for regulating the gains of input signals to predetermined values, a switch portion 55 for selecting one of the outputs of the gain element portions 53, 54, and an integrating element portion 57.

The gain element portions 53, 54 are connected parallel to one another, the gain $K_{N1}$ of the former being larger than the gain $K_{N2}$ of the latter. Therefore according to the judgment of the power command signal judging portion 59, when increasing the power command signal PO, the gain element portion 53 is selected by the switch portion 55, and the gain KN1 is used. On the other hand, when lowering the power command signal PO, the gain element portion 54 is selected by the switch portion 55, and the gain $K_{N2}$ is used.--

UNITED STATES PATENT AND TRADEMARK OFFICE
CERTIFICATE OF CORRECTION

PATENT NO. : 5,160,244
DATED : November 3, 1992
INVENTOR(S) : T. KUWABARA et al

It is certified that error appears in the above-indentified patent and that said Letters Patent is hereby corrected as shown below:

Column 14, line 7, cancel the second occurrence of "the block 307 represents"; and line 23, change "($\#q/\partial h$)" to --($\partial q/\partial h$)--.

Signed and Sealed this

Nineteenth Day of April, 1994

BRUCE LEHMAN

*Attest:*

*Attesting Officer*  *Commissioner of Patents and Trademarks*